US009152222B2

(12) United States Patent
Denker et al.

(10) Patent No.: US 9,152,222 B2
(45) Date of Patent: Oct. 6, 2015

(54) METHOD, APPARATUS, AND SYSTEM FOR FACILITATING CROSS-APPLICATION SEARCHING AND RETRIEVAL OF CONTENT USING A CONTEXTUAL USER MODEL

(71) Applicants: Grit Denker, Palo Alto, CA (US); Rukman Senanayake, San Jose, CA (US)

(72) Inventors: Grit Denker, Palo Alto, CA (US); Rukman Senanayake, San Jose, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 0 days.

(21) Appl. No.: 13/631,318

(22) Filed: Sep. 28, 2012

(65) Prior Publication Data

US 2013/0311508 A1    Nov. 21, 2013

Related U.S. Application Data

(60) Provisional application No. 61/648,503, filed on May 17, 2012.

(51) Int. Cl.
| | | |
|---|---|---|
| *G06F 7/00* | (2006.01) | |
| *G06F 3/01* | (2006.01) | |
| *G06F 17/30* | (2006.01) | |

(52) U.S. Cl.
CPC ............ *G06F 3/01* (2013.01); *G06F 17/30973* (2013.01); *G06F 3/013* (2013.01)

(58) Field of Classification Search
CPC .................................................. G06F 17/30973
USPC ......................................................... 707/767
See application file for complete search history.

(56) References Cited

U.S. PATENT DOCUMENTS

| | | | |
|---|---|---|---|
| 5,886,683 | A | 3/1999 | Tognazzini et al. |
| 6,577,329 | B1 | 6/2003 | Flickner et al. |
| 7,881,493 | B1 | 2/2011 | Edwards et al. |
| 2002/0103625 | A1 | 8/2002 | Card et al. |
| 2003/0128227 | A1 | 7/2003 | Crow et al. |
| 2005/0243054 | A1 | 11/2005 | Beymer et al. |
| 2006/0123001 | A1 | 6/2006 | Burns |
| 2006/0192775 | A1 | 8/2006 | Nicholson et al. |
| 2010/0180200 | A1 | 7/2010 | Donneau-Golencer et al. |
| 2011/0260965 | A1 | 10/2011 | Kim et al. |
| 2011/0276377 | A1 | 11/2011 | Kim et al. |
| 2011/0295612 | A1 | 12/2011 | Donneau-Golencer et al. |
| 2012/0004511 | A1 | 1/2012 | Sivadas |
| 2012/0131020 | A1 | 5/2012 | Nitz et al. |
| 2012/0143791 | A1 | 6/2012 | Sathish |
| 2012/0166583 | A1 | 6/2012 | Koonce et al. |

(Continued)

OTHER PUBLICATIONS

U.S. Appl. No. 13/399,210 to Senanayake et al., filed Feb. 17, 2012, 44 pages.
U.S. Appl. No. 13/534,155 to Senanayake et al., filed Jun. 27, 2012, 75 pages.

(Continued)

*Primary Examiner* — Ajith Jacob
(74) *Attorney, Agent, or Firm* — Barnes & Thornburg LLP; Thomas J. McWilliams; Edward F. Behm, Jr.

(57) ABSTRACT

A method, apparatus, and system for facilitating cross-application searching and retrieval of computer-stored content using a contextual user model includes using passive and/or active interaction data to formulate a user-specific search query. In some embodiments, inferences relating to the user's current interaction context may be used to automatically retrieve relevant information for the user.

32 Claims, 13 Drawing Sheets

(56) References Cited

U.S. PATENT DOCUMENTS

| | | |
|---|---|---|
| 2012/0313854 A1 | 12/2012 | Senanayake et al. |
| 2013/0038564 A1 | 2/2013 | Ho |
| 2013/0185081 A1 | 7/2013 | Cheyer et al. |
| 2014/0033035 A1 | 1/2014 | Crow et al. |

OTHER PUBLICATIONS

U.S. Appl. No. 13/631,292 to Senanayake et al., filed Sep. 28, 2012, 64 pages.

U.S. Appl. No. 13/631,349 to Denker et al., filed Sep. 28, 2012, 62 pages.

U.S. Appl. No. 13/631,381 to Denker et al., filed Sep. 28, 2012, 64 pages.

METHOD, APPARATUS, AND SYSTEM FOR FACILITATING CROSS-APPLICATION SEARCHING AND RETRIEVAL OF CONTENT USING A CONTEXTUAL USER MODEL

CROSS-REFERENCE TO RELATED APPLICATION

This application claims the benefit of and priority to U.S. Provisional Patent Application Ser. No. 61/648,503, filed May 17, 2012, which is incorporated herein by this reference in its entirety.

BACKGROUND

In a typical, traditional computing system environment, users interact with multiple different software applications, e.g. email, Internet browsers, word processing, calendars, and so on. The semantic meaning of each interaction with each application may be implicitly known by the particular application. For example, an email application may be aware of particular high-level functions (such as sending a message) performed by the user within that application. However, the computing system generally does not maintain a collective, semantic model of all of the meaningful activities the user has performed or is performing, across multiple different applications. In other words, the computing system may be aware that an email application and a calendar application are both currently executing, and may be aware of system-level calls that those applications make, but the system does not know what the user is functionally doing within each of those applications, and thus is unable to communicate that information in a form that is understandable to the user. Rather, that level of semantic awareness typically remains confined within the individual applications. This issue is compounded in the context of a collaborative group of users: as a traditional computing system is not aware at a high-level of what each of the individual users is doing across various applications, it is all the more unaware of the significance of those actions for the group.

SUMMARY

According to at least one aspect of this disclosure, a content discovery module to retrieve content in an automated fashion at a computing device, including executable instructions embodied in one or more machine-readable media, is configured to: access a contextual user model, where the contextual user model includes gaze-tracking data including one or more real-time sensor inputs indicative of user gaze in relation to on-screen locations of a display of the computing device; and semantic descriptions of user interface elements displayed at the on-screen locations corresponding to the gaze-tracking data, where the semantic descriptions include information about the user interface elements; generate an inference relating to a user-specific current interaction context based on the contextual user model; formulate a search query including one or more aspects of the user-specific current interaction context; execute the search query across one or more software applications; and present one or more results of the search query at the computing device.

The content discovery module may be configured to determine, based on the gaze-tracking data, a plurality of recently-viewed user interface elements associated with a plurality of different software applications, determine search criteria based on one or more of the recently-viewed user interface elements, and formulate the search query using the search criteria.

The recently-viewed user interface elements may include an email message, a calendar appointment, an electronic document, or a web page. The content discovery module may be configured to execute the search query across a plurality of networked computing devices. The content discovery module may be configured to generate the inference based on a semantic description of a user interface element displayed at an on-screen location corresponding to the user gaze. The content discovery module may be configured to incorporate at least a portion of the semantic description into the search query. The portion of the semantic description incorporated into the search query may include a keyword or topic derived from the user interface element.

The content discovery module may be configured to generate the inference based on gaze-tracking data indicating a duration of user gaze at an on-screen location corresponding to a user interface element. The content discovery module may be configured to incorporate into the search query at least a portion of a semantic description associated with the user interface element located at the on-screen location of user gaze. The content discovery module may be configured to generate the inference based on gaze-tracking data indicating an intensity of user gaze at an on-screen location corresponding to a user interface element. The content discovery module may be configured to incorporate into the search query at least a portion of a semantic description associated with the user interface element located at the on-screen location of user gaze.

The content discovery module may be configured to dynamically change the presentation of the results based on the user-specific current interaction context. The content discovery module may be configured to present the results at an on-screen location corresponding to gaze-tracking data indicating a duration of user gaze. The content discovery module may be configured to present the results at an on-screen location corresponding to gaze-tracking data indicating an intensity of user gaze The content discovery module may be configured to receive user feedback in response to a presented result and modify the presentation of results in response to the user feedback.

The content discovery module may include application event data from a plurality of software applications and semantic descriptions of the application event data, and the content discovery module may be configured to incorporate into the search query at least a portion of a semantic description associated with the application event data.

According to at least one aspect of this disclosure, a method for retrieving content in an automated fashion at a computing device includes maintaining a contextual user model including gaze-tracking data including one or more real-time sensor inputs indicative of user gaze in relation to on-screen locations of a display of the computing device; and semantic descriptions of user interface elements displayed at the on-screen locations corresponding to the gaze-tracking data, the semantic descriptions including information about the user interface elements; generating an inference relating to a user-specific current interaction context based on the contextual user model; formulating a search query including one or more aspects of the user-specific current interaction context; executing the search query across one or more software applications; and presenting one or more results of the search query at the computing device.

According to at least one aspect of this disclosure, a computing system includes a display; a sensor subsystem to obtain gaze-tracking data, the gaze-tracking data being indicative of a user's gaze in relation to the display; and one or more processors; and one or more machine-readable media having stored therein a plurality of instructions that when executed by the processor cause the computing system to perform any of the foregoing methods.

According to at least one aspect of this disclosure, a cognitive contextual search module to retrieve content in response to user input at a computing device, including executable instructions embodied in one or more machine-readable media, is configured to: receive a search request including a data characteristic and a user-specific interaction characteristic; access a contextual user model, the contextual user model including: gaze-tracking data including one or more real-time sensor inputs indicative of a person's gaze in relation to on-screen locations of a display of the computing device; and semantic descriptions of user interface elements displayed at the on-screen locations corresponding to the gaze-tracking data, the semantic descriptions including information about the user interface elements; perform a search based on the search request and based on the contextual user model to obtain one or more search results; and present the search results at the computing device.

The data characteristic may relate to a software application and the interaction characteristic may relate to a different software application. The search module may be configured to interpret the search request using one or more of the semantic descriptions from the contextual user model. The data characteristic may include a keyword or meta data and the interaction characteristic may include a reference to a prior user-specific interaction. The search module may be configured to map the reference to a prior user-specific interaction to a semantic description contained in the contextual user model. The search module may be configured to searchably index a plurality of content with prior interaction information from the contextual user model. The searchably indexed content may include content from a plurality of software applications. The searchably indexed content may include content located on a plurality of networked computing devices.

The search module may be configured to dynamically change the presentation of a search result based on the gaze-tracking data. The search module may be configured to execute the search query across a plurality of software applications at the computing device. The search module may be configured to receive user feedback in response to a presented search result and may modify the presentation of the search result in response to the user feedback.

The contextual user model may include application event data from a plurality of software applications and semantic descriptions of the application event data, and the search module may be configured to interpret the search request based on a semantic description associated with the application event data.

According to at least one aspect of this disclosure, a method for retrieving content in response to user input at a computing device includes receiving a search request including a data characteristic and a user-specific interaction characteristic; maintaining a contextual user model, the contextual user model including: gaze-tracking data including one or more real-time sensor inputs indicative of a person's gaze in relation to on-screen locations of a display of the computing device; and semantic descriptions of user interface elements displayed at the on-screen locations corresponding to the gaze-tracking data, the semantic descriptions including information about the user interface elements; interpreting the search request based on the contextual user model; developing a search query based on the interpreted search request; executing the search query across one or more software applications to obtain one or more search results; and presenting the search results at the computing device.

According to at least one aspect of this disclosure, a computing system includes a display; a sensor subsystem to obtain gaze-tracking data, the gaze-tracking data being indicative of a user's gaze in relation to the display; one or more processors; and one or more machine-readable media having stored therein a plurality of instructions that when executed by the processor cause the computing system to perform any of the foregoing methods.

According to at least one aspect of this disclosure, a method for retrieving content based on user-specific interaction data at a computing device includes maintaining a contextual user model, the contextual user model including: passive interaction data including one or more real-time sensor inputs indicative of a passive user interaction in relation to on-screen locations of a display of the computing device, the passive user interaction being an interaction that does not result in an application event; active interaction data relating to a user interaction that results in an application event; and semantic descriptions of user interface elements displayed at the on-screen locations corresponding to the active and passive interaction data, the semantic descriptions including information about the user interface elements; determining a user-specific current interaction context based on the contextual user model; performing a search based on the user-specific current interaction context to obtain one or more search results; and presenting the search results at the computing device.

BRIEF DESCRIPTION OF THE DRAWINGS

This disclosure is illustrated by way of example and not by way of limitation in the accompanying figures. The figures may, alone or in combination, illustrate one or more embodiments of the disclosure. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

DETAILED DESCRIPTION OF THE DRAWINGS

Figure 1:
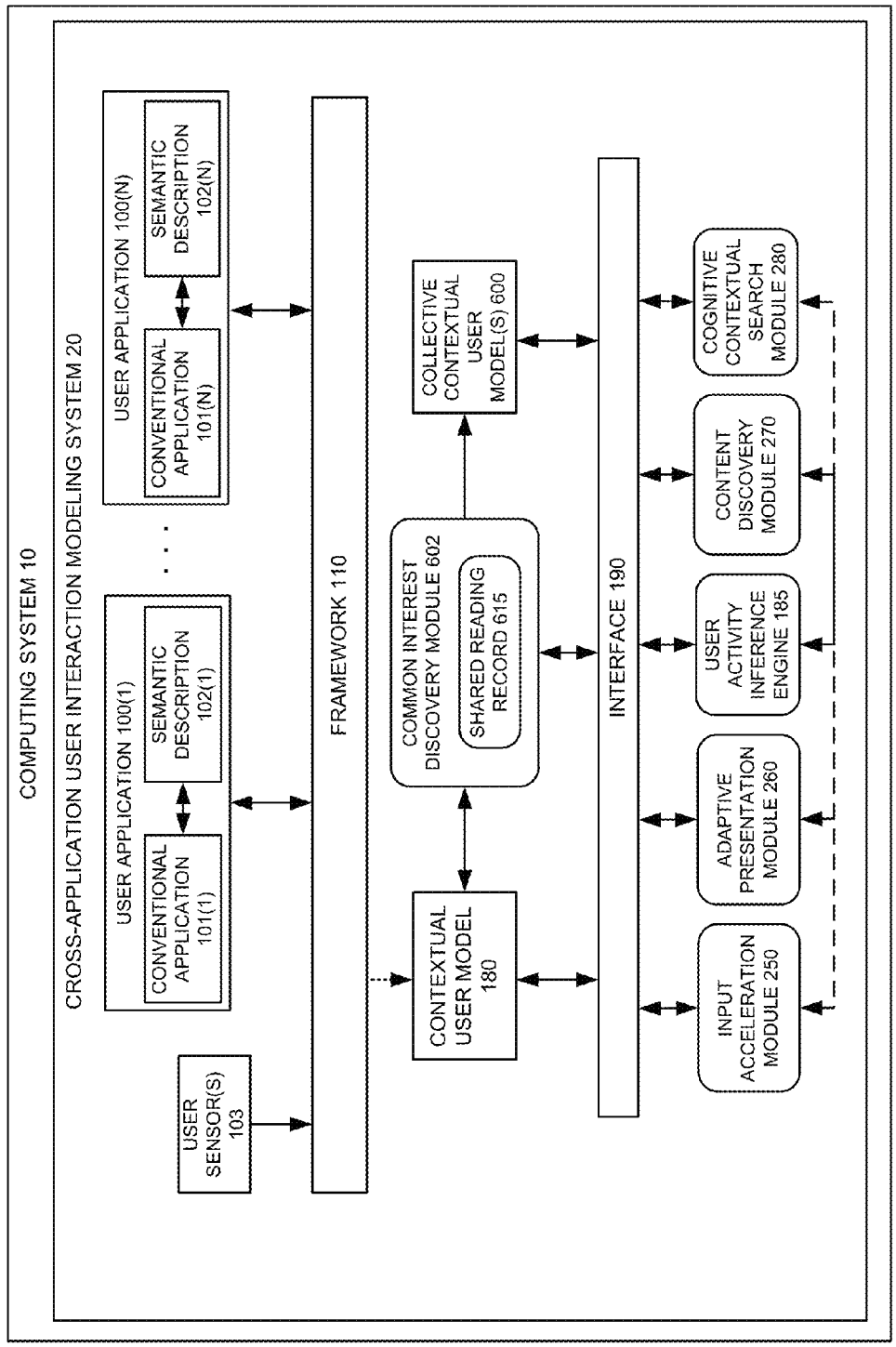
FIG. 1 is a simplified module diagram of at least one embodiment of a cross-application system for modeling passive and active user interactions with a computing system.

While the concepts of the present disclosure are susceptible to various modifications and alternative forms, specific embodiments thereof are shown by way of example in the drawings and are described in detail below. It should be understood, however, that there is no intent to limit the concepts of the present disclosure to the particular forms disclosed, but on the contrary, the intention is to cover all modifications, equivalents, and alternatives consistent with the present disclosure and the appended claims.

Computer-based methods and apparatus are disclosed for maintaining a semantically meaningful model of a user's interactions with multiple applications of a computing system. In some embodiments, interactive applications of the computing system comprise, or are enhanced with, a high-level description of each action that a user can potentially request or initiate. As and when an action is processed by an application, the corresponding description of that action is published or posted to a stored model. Interactive applications may further comprise, or be enhanced with, a high-level description of the content that is displayed by the application in various contexts. The current location of a user's gaze with respect to the screen or display of the computing may be tracked by a sensor subsystem. The application that is responsible for the displayed content being viewed by a user at a given moment (as per the user's tracked gaze) may report or post the corresponding description of that content to the stored model. The stored model may include short-term and long-term repositories, as well as parameters representing a rough model of the user's relevant cognitive and locomotive capabilities (e.g. duration of memories; minimum times required to process displayed content or to readjust gaze, etc.).

In this way, a semantically meaningful, contextual, model of what a user is seeing (or has seen) and is doing (or has done) is maintained with respect to the user's activities across multiple different software applications. In various embodiments, this model is leveraged by the system to facilitate intelligent, automated analysis of how best to assist the user in a variety of ways, such as input acceleration, adaptive presentation, discovery, and cognitive contextual or "workflow"-based searching. In further embodiments, contextual models are maintained for a group of collaborating users, and those models can be collectively and intelligently analyzed by, e.g., an executive-level management module, in order to provide insights regarding group-level behavior or otherwise leverage the interactions of the individual users for the benefit of the group.

Referring now to FIG. 1, a cross-application user interaction modeling system 20 is embodied in a computing system 10 as a number of computer-executable modules, each of which may be implemented as software, firmware, hardware or a combination thereof. The illustrative system 20 includes a framework 110, which interfaces with a number of user-level software applications 100(1) to 100(N) (where N is a positive integer), to, while a user is working in one or more of the applications 100, obtain high-level semantic descriptions of the user's interactions with the various applications. As such, each of the user applications 100 includes a conventional (now existing or later-developed) executable software application 101 (e.g., email, calendar, word processor, etc.) that is extended by or coupled with a semantic description 102.

As explained further below, semantic description 102 describes both "passive" and "active" user interactions with an application 101 in a manner that is meaningful and useful at a user level (as opposed to a lower level that is more useful to the computer). As used herein, "passive" refers generally to user interactions with computing devices where the interactions do not directly result in an application event, while "active" refers generally to user interactions with computing devices that do result in the occurrence of an application event. Some examples of active interactions include certain gestures (e.g., "swipe," "tap," "drag"), and other methods of physically contacting a keyboard, keypad, mouse, touch-screen, hardpanel control or other input mechanism of the computing device (e.g. to activate a user interface control, enter or select data, or select a displayed option).

Some examples of passive user interactions include user movements or activity that may be detected by one or more sensors or other peripheral components of or in communication with the computing device, such as optical sensors, proximity sensors, force sensors, cameras, and/or others, which may be integrated with the computing device or otherwise located in the user's environment (e.g., cameras or other sensors located in a room of a building). For instance, optical sensors or cameras may detect that a person's eyes are focused on a particular area of the display screen even though the person is not actively interacting with the computing device. Similarly, proximity sensors may detect movement of a portion of the user's body (e.g., fingers, hands, arms) toward or away from a particular portion of a touch-sensitive display screen, mouse, or keyboard, without the person actively touching such component, or with the person actively touching the screen or other component, but with the system noticing the degree of force applied to the component (which may be an indicator of the person's stress level, for example) or other conditions, based on the force or pressure detected by the sensor. In other words, "passive" may refer to the fact that the user is not actively aware of his or her activity (e.g., the changes in force or pressure he or she is applying to the component of the computing device), but the system 20 may sense it. As another example, cameras or other sensing devices may detect the user's movements or gestures (e.g., hand waving, pointing, raising or lowering an arm), and the system 20 may incorporate semantic information relating to such movements or gestures into the user's current interaction context. Whereas such changes in force, pressure, or movement do not result in a conventional software application behaving any differently (e.g., in response to a change in a person's stress or activity level), the system 20 can, through, e.g., the input acceleration module 250 or the adaptive presentation module 260, cause an application to respond differently or more appropriately based on these inputs.

The semantic description 102 is created using common terms of reference (e.g., an ontology) for the various features, functions, and data involved in user interactions with each of the applications 101, and may specify, for example, mandatory data fields and relationships among the fields. When a user interaction occurs, the low-level (e.g., machine or operating system level) representation of the interaction is annotated with the corresponding common terms of reference. For example, an ontology for an email application may associate the system-level representation of data in the addressee field of an email message with the label "first name, last name." In cross-application environments, multi-user environments, or other situations in which multiple different ontologies may be employed (e.g., by the various applications or by different users), the semantic description may resolve the differences between the ontologies by mapping the corresponding terms of reference across the ontologies. For instance, data identified as "last name" in one application or ontology might map to data labeled as "family name" in another application or ontology.

The framework 110 also receives inputs from a number of user sensors 103, including, for example, sensors that can track the user's gaze in relation to a display screen of the computing system 10. As described in more detail below, the framework 110 maps the sensor inputs to the corresponding application's user interaction information, including the semantic descriptions, and posts the semantically-enhanced interaction information to a contextual user model 180 in real time (where "post" is used herein to refer to any suitable type of data transmission technique, e.g., 'push' or 'pull' techniques).

Various features of the system 20 are implemented as computer-executable modules that access and use the contextual user model 180 via an interface 190 (which may include, for example, one or more application programming interfaces or APIs, query interfaces, and/or other similar mechanisms, which may be accessed programmatically or by a user), and/or a user activity inference engine 185. Illustratively, these modules include an input acceleration module 250, an adaptive presentation module 260, a content discovery module 270, a user activity inference engine 185, a cognitive contextual or "workflow"-based search module 280, a common interest discovery module 602, and one or more collective contextual user models 600, each of which is described in greater detail below.

The illustrative inference engine 185 is embodied as a computer-executable module or subsystem that applies, e.g., artificial intelligence methods, algorithms, and/or techniques (using, e.g. probabilistic and/or statistical models) to make intelligent inferences about the user's current activity with respect to the computing system 10 (i.e., user interactions with a computer of the computing system 10) based on the interaction data stored in the contextual user model 180. The inference engine 185 makes these inferences available to the content discovery module 270 as described below, and the other modules 250, 260, 280, and 602 may utilize such inferences as well. The inference engine 185 may draw inferences from the contextual user model 180 and/or one or more of the collective contextual user models 600, in some embodiments, and may store the inferences in one or more of the user models 180, 600.

Figure 2:
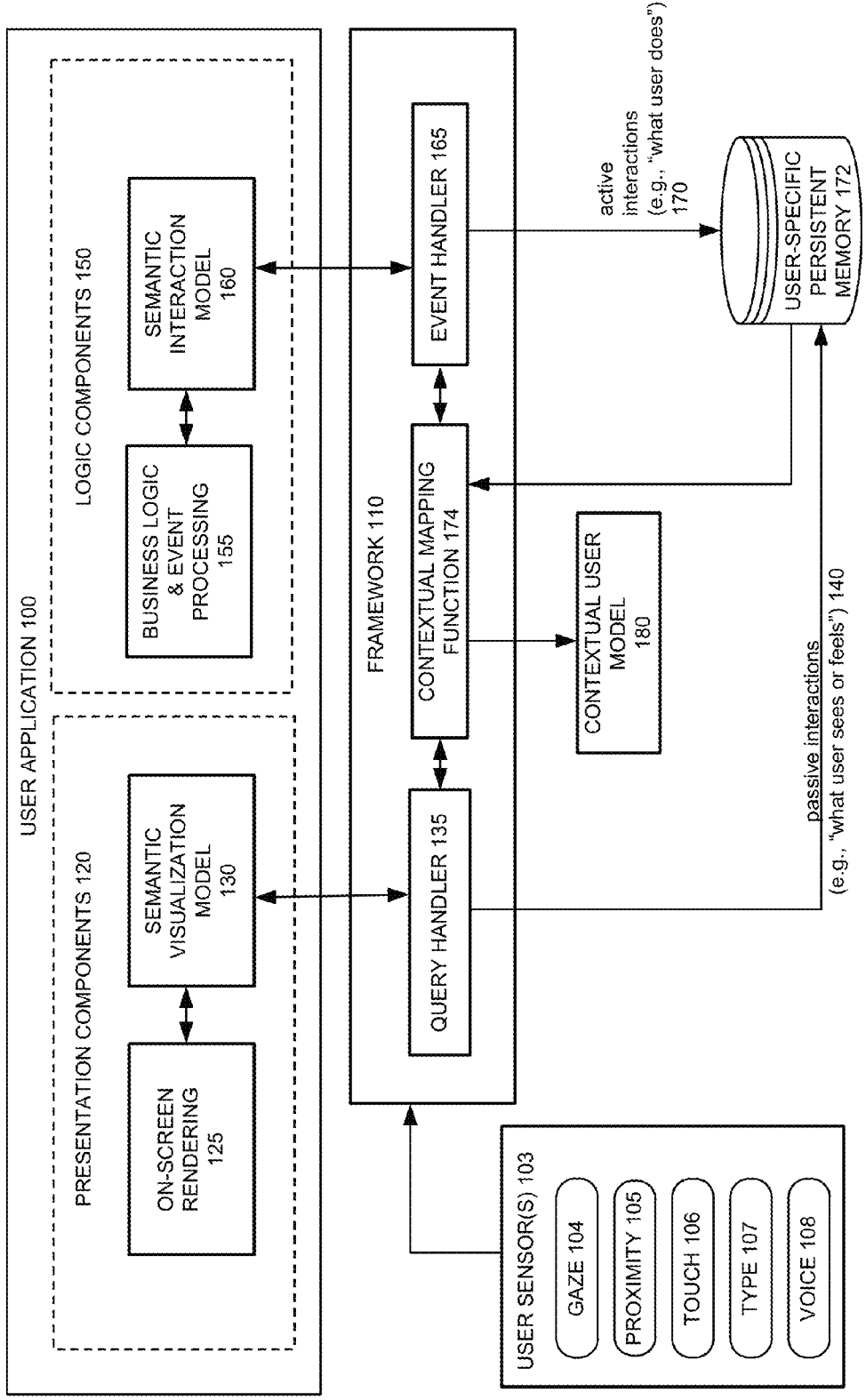
FIG. 2 is a simplified module diagram illustrating additional details of at least one embodiment of the system of FIG. 1.

FIG. 2 depicts additional details of the system 20, in which a representative interactive application 100 comprises presentation components 120 that are responsible for interactive display content, and logic components 150 that are responsible for processing events and conditions and performing the appropriate tasks of the application. For example, in an exemplary email application implemented in accordance with the design of application 100, presentation components 120 include on-screen rendering component 125, which is responsible for displaying an appropriate array of content and choices (e.g. in the context of viewing an email, display elements might include the current message header and text, and interactively selectable choices such as reply, forward, save to folder, delete, etc.). Logic components 150 include business logic and event processing component 155, which is responsible for carrying out relevant tasks—such as transmitting a message, or saving or deleting a received message—in response to user-selected choices.

Presentation components 120 and logic components 150 also include, respectively, semantic description components 130 and 160, in order to support the creation and maintenance of the cross-application, semantic, contextual user model 180, as will be described below. Semantic visualization model 130 describes at a useful high level the user interface elements (e.g., dialogs, controls, text, graphics, etc.) that are located on the display screen of the computing system 10 at the location corresponding to the user's passive interaction as sensed by user sensor(s) 103 (e.g., the on-screen location of the user's gaze, or the on-screen location corresponding to the user's gesture, movement, hand position, etc.). For example, if a gaze tracking system 104 detects that the user has been looking at a particular paragraph of a document explaining 'cloud computing' for a prolonged period of time, semantic visualization model 130 may make available to the framework 110 the following information: "user=user ID, action=reading document, content=cloud computing, status=read and absorbed," in addition to the date, time, and/or (perhaps, if location information is available to the system 20), the geographic location at which the interaction occurred.

Semantic interaction model 160 describes the application events that are initiated by various "active" user interactions (e.g., touch, typing, voice, gesture), the business logic that is executed as a result of the application event, and the results of the execution of the business logic. For example, when a user presses the "send" button after creating a new email message, semantic interaction model 160 may make available to the framework 110 the following information: "sender=user ID, action=send email, recipient=John Smith, status=send complete," in addition to the date, time, email content, and/or geographic location at which the interaction occurred.

The following example illustrates how application 100 can provide real-time posts to contextual user model 180 of passive interactions (e.g., "what the user sees") within the ambit of application 100. In the exemplary computing system 10, gaze sensor(s) 104 detect and track the gaze of a user of the system, such as by means of one or more gaze-tracking mechanisms that are conventionally available, or by means of the multi-camera sensor system for user gaze tracking described in pending U.S. patent application Ser. No. 13/158,109 (Adaptable Input/Output Device) and Ser. No. 13/399,210 (Adaptable Actuated Input Device with Integrated Proximity Detection). The current on-screen location of a user's gaze is fed to framework 110, which may be implemented as a system or middleware component of the system 20. Framework 110 queries application 100 to determine what content is displayed at the location of the current gaze—in other words, what does the user see? Framework 110 may itself determine that the current gaze location falls within the screen area currently occupied by the display of application 100;

alternatively, framework 100 might submit queries to all or several current applications, which might themselves determine whether the gaze location falls within their on-screen area. In any case, query handler 135 processes that query by obtaining from semantic visualization model 130 a semantically meaningful description of what is currently displayed by application 100 at the identified location. In various embodiments, the semantic description provided by semantic visualization model 130 may include a high-level, functional description of the specified portion of the display (e.g., an indication that the subject line or addressee list of message #XXX is displayed at the specified location) as well as actual content of the display (e.g. the text that is displayed at that location). This semantic-level information is returned to framework 110, which in turn posts the information 140 to contextual user model 180 for incorporation in the model.

Inputs from other sensors that capture more or less "passive" user interactions with the computing system 10, such as proximity sensors 105 (which can detect user movements relative to a computer display, keyboard, or other component of the system 10) or force or pressure sensors 107 (which can detect variations in the amount of force applied by the user when typing on, e.g., a keyboard or keypad), may be handled in a similar fashion.

Logic components 150 provide real-time posts to contextual user model 180 of "what the user does" within the ambit of application 100. As outlined in FIG. 1, business logic and event processing component 155 interfaces with semantic description component 160. When an event occurs and is processed—e.g., a message is deleted in response to the user's request—event handler 165 obtains a functional, high-level description of that event from semantic interaction model 160, and posts that descriptive information 170 of what the user did to contextual user model 180. By "high level" description of user interactions we mean describing an interaction at a level that is meaningful from a user perspective, generally at a higher abstraction layer than raw system operations. For example, reading and replying to email, searching the web and modifying calendars are common user interactions.

In some embodiments, the methods described are also applied to web-based interactive material. Such material may be enhanced or processed so that its display and execution by a browser on the user's device will post to contextual user model 180 high-level descriptions of what the user sees and does, as above. In some cases, the HTML and/or other markup that defines the display and behavior of a web page or application is suggestive of the high-level structure and meaning of display elements and interactive links, such that semantic descriptions analogous to descriptions 130 and 160 can be readily extracted. In a further embodiment, web pages written in a standard mark-up language (e.g. HTML) are augmented at their source with additional descriptive mark-up in a semantic mark-up language (such as RDF or OWL, for example). A browser application 100 of the exemplary embodiment treats each piece of semantic mark-up as semantic descriptions for the corresponding piece of HTML that is rendered by the browser and is viewed ("what the user sees") or interacted with (e.g. clicked—"what the user does") by the user. In some embodiments, the additional semantic mark-up is encoded or formatted so as to be ignored by browsers in conventional systems not equipped with requisite elements of the present invention. In a still further embodiment, instances of semantic descriptions 130 and 160 can be prepared on-the-fly by "screen scraping" online materials that are accessed: essentially, display frames rendered by the browser are processed OCR-style (e.g. by the browser, or by framework 110) in order to automatically recognize words and numbers, as well as potentially other objects with conventional semantic meaning, e.g. labeled or unlabelled boxes, arrows, or buttons that may connote controls—e.g. "OK", "Cancel", "Quit", "Close", > (play button), >>, etc.—and/or other objects with semantic significance for the user such as faces. For common web-based applications with relatively familiar interface features and controls—such as hosted online email and calendars—templates or rules can be provided to drive recognition of certain canonical words or shapes with conventional high-level meanings (e.g. "send", "reply"; disk icon for "save"; standard grid of a calendar, etc.). In this way, even displays generated by browser execution of web-based Flash or JavaScript code can be handled as if semantically marked, albeit more speculatively and less completely.

In the illustrative embodiment, the information 140, 170 is stored at least initially in a user-specific persistent memory 172. That is, information about all of the user's passive and active interactions with the computing system 10 (or with one or more specific computing devices thereof) is maintained in the memory 172. A contextual mapping function 174 executes logic to determine whether a particular interaction is one that may be an indicator of the user's current interaction context, and if so, updates the contextual user model 180 to include the interaction of interest. For example, interactions such as scrolling or resizing a window on the display screen would not typically reveal much about what, substantively, the user is doing with the computing device and therefore would not be added to the contextual user model 180, while interactions such as reading a document or sending an email message would be of interest in understanding the user's current interaction context and thus would be stored in the contextual user model 180. As used herein, the term "current interaction context" refers to the user's situation and/or circumstances as they relate to the user's interactions with a computing system, at a particular moment in time: what documents they may be reading or working in, what other users they may be communicating with (via, e.g., email or messaging systems), the degree to which the user is actively using the computing device, the user's mode of interaction with the device (e.g., whether the user prefers mouse, keypad, or voice), etc.

The contextual mapping function 174 also applies cognitive and/or locomotive parameters to the various interaction data, as described further below. Using those parameters, the interaction data is classified as information that would typically be retained in the user's short term memory or long term memory, as the case may be. Information that has not yet been cognitively processed by the user may be classified by the contextual mapping function 174 as pre-cognitive content. As the user-specific persistent memory 172 keeps track of all of the user's interactions (not just those that would typically be retained in short term or long term memory, or those that are considered pre-cognitive), the persistent memory 172 can allow the system 20 to help the user recall information that the user has forgotten. Accordingly, in some embodiments, portions of the persistent memory 172 may be at least temporarily copied, moved, or associated with (e.g., via pointers or meta data) to the contextual user model 180 and processed by the contextual mapping function 174. In the illustrative embodiment, the interaction data stored in the persistent memory 172 is semantically enhanced as described herein prior to storage in the persistent memory 172. In other embodiments, the persistent memory 172 may keep track of the more or less low-level or machine accessible interaction data without semantic enhancement, alternatively or in addition to the semantically-enhanced interaction data.

Figure 3:
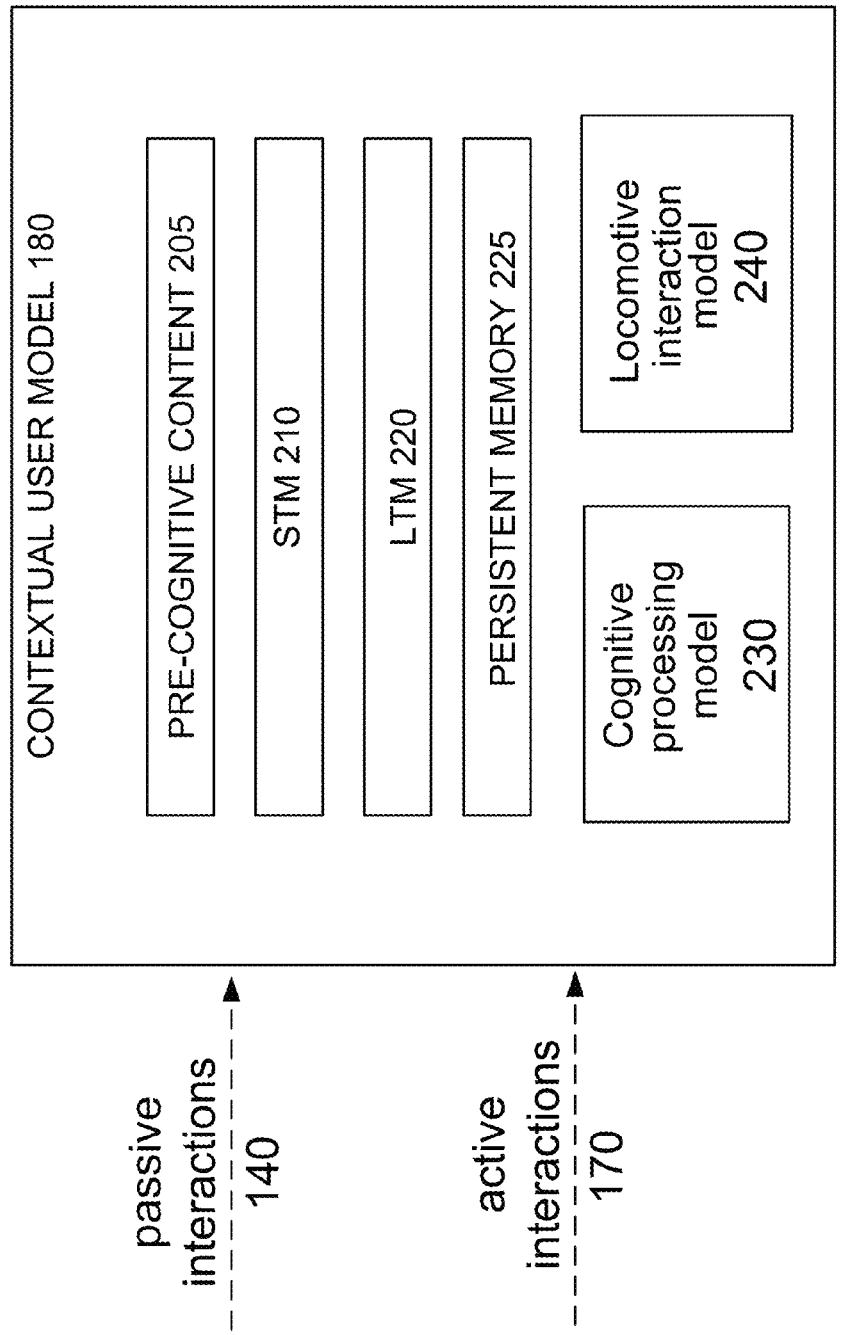
FIG. 3 is a simplified module diagram of at least one embodiment of a contextual user model that may be used in connection with the system of FIG. 1.

FIG. 3 illustrates contextual user model 180 in greater detail. In an exemplary embodiment, contextual user model 180 includes pre-cognitive content 205, a short-term memory (STM) 210, a long-term memory (LTM) 220, and a persistent memory 225, which may be a portion or subset of the persistent memory 172. In other embodiments, one or more of these sub-areas may be omitted from the contextual user model 180. For example, some embodiments of the contextual user model 180 may include only the STM 210, or only the STM 210 and LTM 220.

The passive interaction data 140 and active interaction data 170 are stored in STM 210, but are over time are aged and removed. Entries removed from STM 210 may be selectively transferred to LTM 220 for longer term storage. For example, it is thought that much of the material that ends up in a human being's long term memory consists of things to which that individual is repeatedly exposed, on a consistent basis, thereby reinforcing the memory. Similarly, in some embodiments, entries from STM 210 representing content which the user has repeatedly accessed or interacted with are transferred to LTM 220, in an attempt to model (albeit only roughly) the set of content that the human user would tend to retain in their own long term memory. The intention is that at any given time, STM 210 should more or less reflect what actually is in the user's short-term memory and awareness: namely, what has the user recently seen or done in the user's interactions with the system. Analogously, LTM 220 is intended to reflect what is in the user's longer-term memory, and is less likely to be within the user's current consciousness absent a reminder. The LTM 220 differs from the persistent memory 225 in that the persistent memory 225 retains information that the user has completely forgotten, i.e., that the user cannot recall even with a reminder. In some embodiments, persistent memory 225, pre-cognitive content 205, STM 210, and LTM 220 are each searchably indexed by the system, in order to facilitate various forms of intelligent assistance and information retrieval, as described below in connection with modules 250 (input accelerator), 260 (adaptive presentation), 270 (discovery), 280 (cognitive-contextual or "workflow-based" search), and 602 (common interest discovery).

Contextual user model 180 further includes cognitive processing model 230, which may include parameters for characterizing the duration of particular entries in STM 210 and LTM 220. For example, such parameters may be based on cognitive science findings regarding the typical lengths of time over which content can be presumed to have faded from a human user's short-term memory and/or attention, and that should therefore be removed from STM 210 and potentially transferred to LTM 220. In some embodiments, the parameters of model 230 may be functions of variables such as the time of day (e.g., reflecting diminished retention later in the day) or the user's location and context (e.g. at home, at work desk, in meeting, on telephone call, etc.). In still further embodiments, the parameters of model 230 may be personalized to individual users, e.g. through the system's experience with a particular user, and/or based on demographic factors such as age or disability. In additional embodiments, information may be gradually faded from STM 210 before it is transferred, by being associated with a score (e.g. percentage) indicating a probability of whether that particular information is still within the user's short-term recall.

In addition, cognitive processing model 230 may include parameters for further qualifying the entries of STM 210 and LTM 220. For example, model 230 may include parameters for determining whether particular content that was "seen" by the user, per posting 140, was actually absorbed (cognitively processed) by the user, such as parameters specifying a minimally sufficient amount of time for the user's gaze to be fixed on a given piece of content in order for that content to be read and/or understood. For example, the model may include a parameter specifying how long it takes for a user to read a line of text. Some examples of cognitive parameters are shown in Table 1 below.

TABLE 1

| Attribute: Compare two items | Time Taken |
|---|---|
| Colors | 38 ms |
| Letters | 40 ms |
| Digits | 33 ms |
| Words | 47 ms |
| Shapes | 50 ms |

If postings 140 indicate, for example, that the user's gaze has been briefly fixed on a particular email message, or on a displayed notice or alert, the system can use the above-described parameters to assess whether or not the user is likely to have actually read and processed the contents of the email or the notice. Here again, in some embodiments such parameters are functions of variables such as time of day, location, context, and/or user demographics. Similarly, if there is competition for the user's attention—for example, if the system observes that the user is currently engaged on a phone call or other live conversation—then some embodiments may reflect presumptively diminished attention in cognitive model 230 and/or S™ 210 with respect to on-screen content that is within the user's field of view according to postings 140 during periods of such "multi-tasking" by the user. Conversely, highly repetitive and/or sustained viewing of e.g. a particular portion of a document or other displayed item of information tends to indicate a relatively strong user awareness of, and attention to, that specific piece of information. Moreover, in embodiments where gaze-tracking sensor(s) 105 detect pupil dilation and/or other indicia of attentive focus (e.g., gaze frequency or gaze hot spotting), such metrics can also be reflected in the parameters of model 230, and the assessment of whether a user has mentally processed viewed content can take into account this physical assessment of the user's current level-of-attention. In any case, contextual user model 180, and particularly cognitive model 230 and STM 210, can incorporate a variety of these factors and more realistically reflect whether a user has likely absorbed a given piece of information—not just whether the user's eyeballs were temporarily aimed at it. Accordingly, in some embodiments the system may filter postings 140 on this basis and not incorporate a new posting 140 in STM 210 if it is determined based on model 230 that the content "seen" by the user has probably not (yet) been actually processed; in other embodiments, such content might be incorporated in STM 210 but flagged as not yet (fully) cognitively processed, or as likely to be retained for a shorter (or longer) duration than average.

Contextual user model 180 further includes locomotive processing model 240, which may include parameters for determining where the user's hands are currently located in reference to a display screen or keyboard, for example, and projecting the likely execution time for the user's hands to move to another location. If postings 140 indicate, for example, that the user's hands have been fixed in a particular location for a period of time, the system 20 can use the locomotive processing parameters to relocate user interface elements nearer to the user's hand position. On the other hand, if postings 140 indicate that the user's hands have been very active, the system 20 may decide to leave user interface elements in a central location rather than trying to follow the user's hands. As above, in some embodiments the locomotive parameters may be functions of variables such as time of day, location, context, and/or user demographics. Some examples of locomotive parameters are shown in Table 2 below.

TABLE 2

| Location: Move hands to | Time Taken |
|---|---|
| Mouse | 360 ms |
| Arrow Keys | 210 ms |
| Function Keys | 320 ms |

As noted above, the illustrative contextual user model 180 also includes pre-cognitive content 205. By "pre-cognitive," we mean interactions or material that the system 20 is aware of, which might to be of interest to the user or the user's current context (based on the user's contextual model 180 and/or the user's involvement in one or more collective contextual user models 600, described below), but of which the user is not yet cognitively aware at a substantive level. Such content may include material determined by the gaze-tracking system yet to be cognitively absorbed by the user (e.g., content that the user glanced at briefly before being interrupted by a phone call or meeting notice). Such content may also include, for example, next actions or series or sequences of actions predicted by the input acceleration module 250, and/or content predicted to be of interest to the user as determined by the content discovery module 270, described below. As another example, such content may include a new email message received by the mail client (e.g., client portion of email software), which has already been processed by the system 20 to obtain the sender, subject, and/or other useful information as described above, where such processing occurs before the user is even made aware of the new email message by the mail client. In this way, the system 20 can use the pre-cognitive information (information about the arrived message that the user has not yet seen) and other information in the current user contextual model 180 (e.g., whether the user is working intently on a document in a software application or browsing the Internet) to determine whether to make the user aware of the email message at that moment in time, given the user's current interaction context.

Figure 4:
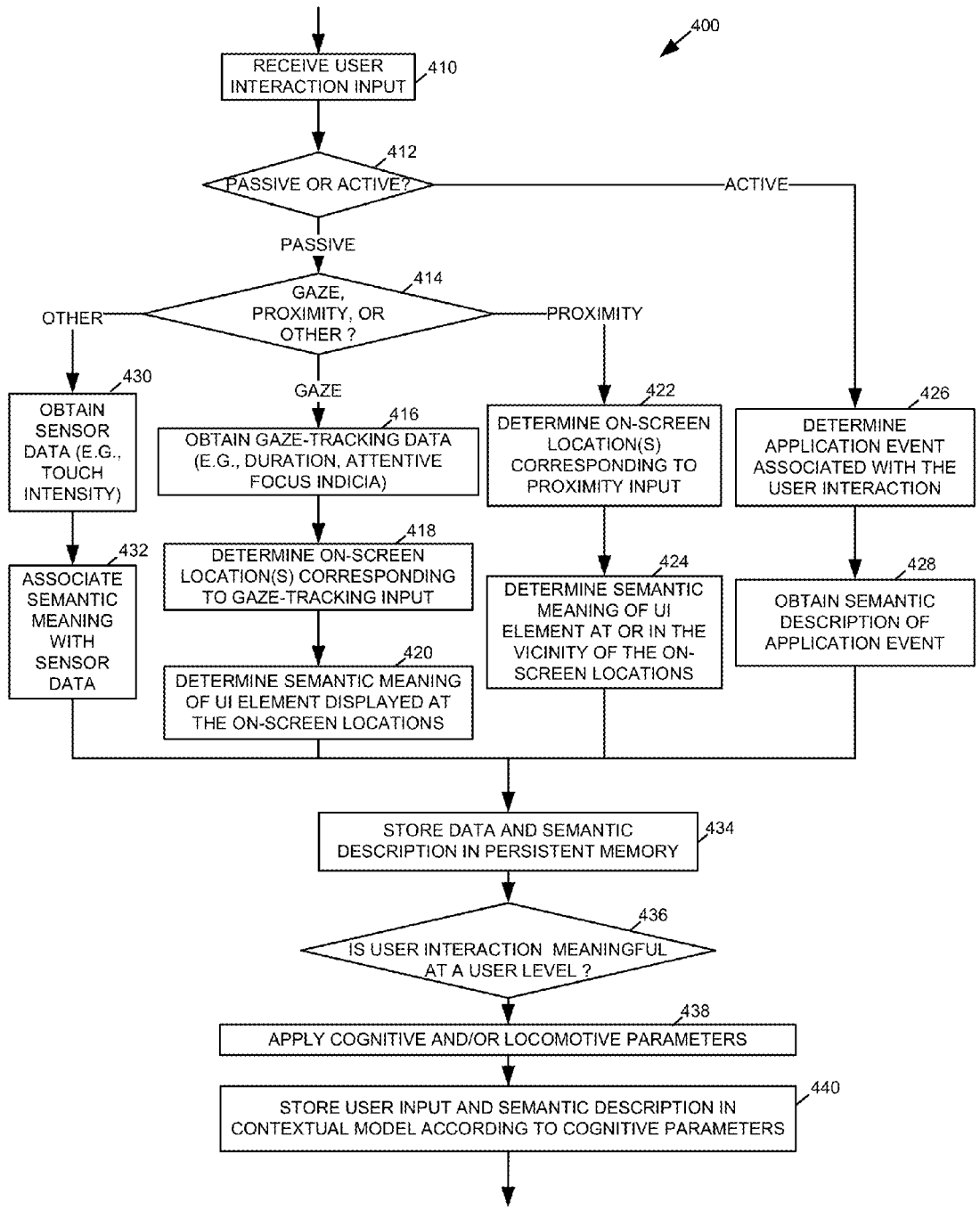
FIG. 4 is a simplified flow diagram for at least one embodiment of a method for developing a contextual, semantic model of passive and active user interactions with a computer system.

Referring now to FIG. 4, an illustrative method 400 executable as computerized programs, routines, logic and/or instructions by one or more of the various modules and/or components of the system 20, to develop and maintain a contextual user model 180, is shown. The method 400 handles various types of user interactions with the computing system 10. As such, the method 400 receives user interaction input (e.g., a keystroke, mouse click, gesture, gaze data, proximity data, or force data) at block 410, determines whether the input is active or passive (i.e., whether it implicates an application event) at block 412, and handles the input accordingly in the subsequent blocks. In the case of active user input (which may involve the user typing on a keyboard or keypad, touching an interactive control on the display screen, issuing a voice command or request, or performing a gesture, for example), the method 400 interfaces with the application 100 with which the input is associated to determine the application event corresponding to the input (block 426), and obtains the semantic description of the application event from the semantic interaction model 160 (block 428) as described above.

In the case of a passive interaction, the method 400 processes the interaction data based on the type of passive interaction, as needed. For gaze input, the method 400 obtains the related gaze-tracking data, which may include the date and time of the gaze, the duration of the gaze, and/or other data indicating the user's degree of attentive focus (e.g., pupil dilation, blinking intervals, etc.), at block 416. At block 418, the method 400 determines the on-screen locations (e.g., the x and y coordinates) that correspond to the user's gaze. At block 420, the method 400 accesses the semantic visualization model 130 to obtain information about the semantic meaning of the user interface element currently displayed at the on-screen location of the user's gaze. Generally speaking, as used herein, the term "user interface element" may refer to interactive controls, content (e.g., graphics, text, or video), previous user inputs (e.g., text entered into a fill-in form), or any other type of object that may be presented on a display of a computing device.

For proximity inputs, the method 400 may determine the on-screen locations or keyboard locations (e.g., x and y coordinates) that correspond most closely to the position of the user's hands (or other body portion) as determined from the proximity input (block 422), and then obtain the semantic meaning of the user interface element displayed at that location or in the vicinity of that location from the semantic visualization model 130 (block 424). Information about user interface elements displayed in the vicinity of, but not at, the on-screen location can be useful to, among other features, the adaptive presentation module 260 as described below. Other indicators of passive user interactions, such as typing intensity (the amount of force the user applies to keys of a keyboard or a keypad and variations thereof over time) may be obtained from sensors at block 430, alternatively or in addition. At block 432, semantic meanings may be associated with such sensor data. In some cases, the semantic meanings obtained at block 432 may be those associated with user interface elements displayed at on-screen locations that are mapped to the sensor inputs, and as such, may be obtained from the semantic visualization model 130.

Once the user interaction data has been received and linked up with the desired semantic information, it is stored in the persistent memory 172 (block 434). At block 436, a periodic or ongoing process (e.g., contextual mapping function 174) evaluates the interaction data stored in the persistent memory 174 and determines whether the interaction data may be useful in understanding the user's current context and thus should be posted to the contextual user model 180. For instance, generic and/or user-specific rules regarding the relative significance of various user interactions may be stored in the contextual user model 180 and applied by the contextual mapping function 174, at block 436. At block 438, the method 400 applies the cognitive and/or locomotive parameters described above (e.g., those stored in the cognitive processing model 230 and/or the locomotive interaction model 240) to determine whether to classify the interaction data as being associated with pre-cognitive content 205, short term memory 210, or long term memory 220, and stores the interaction data in the appropriate sub-area of the contextual user model 180 (or associates the interaction data with the appropriate metadata or other indicators of the corresponding interaction type) at block 440.

Thus, contextual user model 180 maintains an up-to-date, cross-application semantic model of what each user sees/absorbs and does in their interactions with multiple applications on the system. This cross-application semantic model can facilitate intelligent, automated analysis by the system of how best to assist the user in a variety of ways. Four types of examples are now described for illustrative purposes, although practitioners will appreciate that many other types of intelligent assistance are also possible by leveraging contextual user model 180.

Input Acceleration

In some embodiments, the system 100 includes an "input accelerator" module 250. Based on the contents of the contextual user model 180 and particularly the STM 210, the input accelerator 250 infers what the user is currently attempting to accomplish, and presents suggested next steps or actions as selectable options that might be helpful to the user in completing that task. Further details of the input accelerator 250 are described in Senanayake et al., U.S. patent application Ser. No. 13/534,155, filed Jun. 27, 2012, which is incorporated herein by this reference in its entirety.

Adaptive Presentation of User Interface Elements

Similarly, based on user model 180 and particularly STM 210, the system can infer where the user's attention is currently focused, and can take into account the assessment of current user attention, as well as knowledge of what the user has recently seen and absorbed, so as to present interactive controls in a manner and arrangement that is optimal for the user's context, as well as for purposes of prioritizing and presenting informational notices, alerts, or information that is of interest to the user, and the like. This functionality is represented in FIG. 1 by adaptive presentation module 260.

For example, alerts and other notifications may be positioned within the user's current visual focus. If contextual user model 180 indicates the user's attention is deeply focused (e.g. extended visual focus on a narrow set of materials), the logic of module 260 may call for audible, or otherwise highlighted, presentation of urgent and important alerts, while suppressing or delaying less urgent notifications so as to avoid needlessly distracting the user. In a further example, module 260 may infer from sensor data and/or additional current context information (e.g. data from an accelerometer or motion sensor integrated in the user's interactive device, and/or calendar information) that the user is currently in transit, and may therefore dictate audible presentation of information, rather than or in addition to visual presentation.

Similarly, interactive on-screen controls associated with the user's current or anticipated task—for example, the display of selectable "next actions" (or sequences of actions or "workflows") generated under control of input accelerator 250 described above—may be positioned in a location and manner convenient for the user. In some embodiments, particularly those with touch-sensitive and/or gesture-sensitive input, the position of a user's hands/extremities is also tracked, e.g. by proximity sensors included in user sensor(s) 150. Module 260 may then dictate that interactive controls be positioned proximately to the user's hands for easy reach. If the user's visual focus and hands are in different locations, then module 260 may dictate displaying within the user's visual field a depiction of the user's hands and the relative positioning of interactive controls (see the "heads-up" interaction methodology described in pending U.S. patent application Ser. No. 13/399,210, Adaptable Actuated Input Device with Integrated Proximity Detection). In determining the optimal presentation (e.g. positioning, arrangement) of interactive controls for a given context, locomotive interaction model 240 may be usefully referenced by adaptive presentation module 260, to obtain parameters or rules reflecting the time required for a user to perform various interactive hand movements, visual adjustments, and the like (see FIG. 3 for examples of such parameters). For example, if contextual user model 180 captures that a user has begun moving a cursor (e.g. via mouse) towards a selectable set of choices, then—depending on the parameters of locomotive model 240 and the relevant distances—adaptive presentation module 260 may dynamically relocate the selections so that the user can make a selection without completing the mouse traversal.

Figure 5:
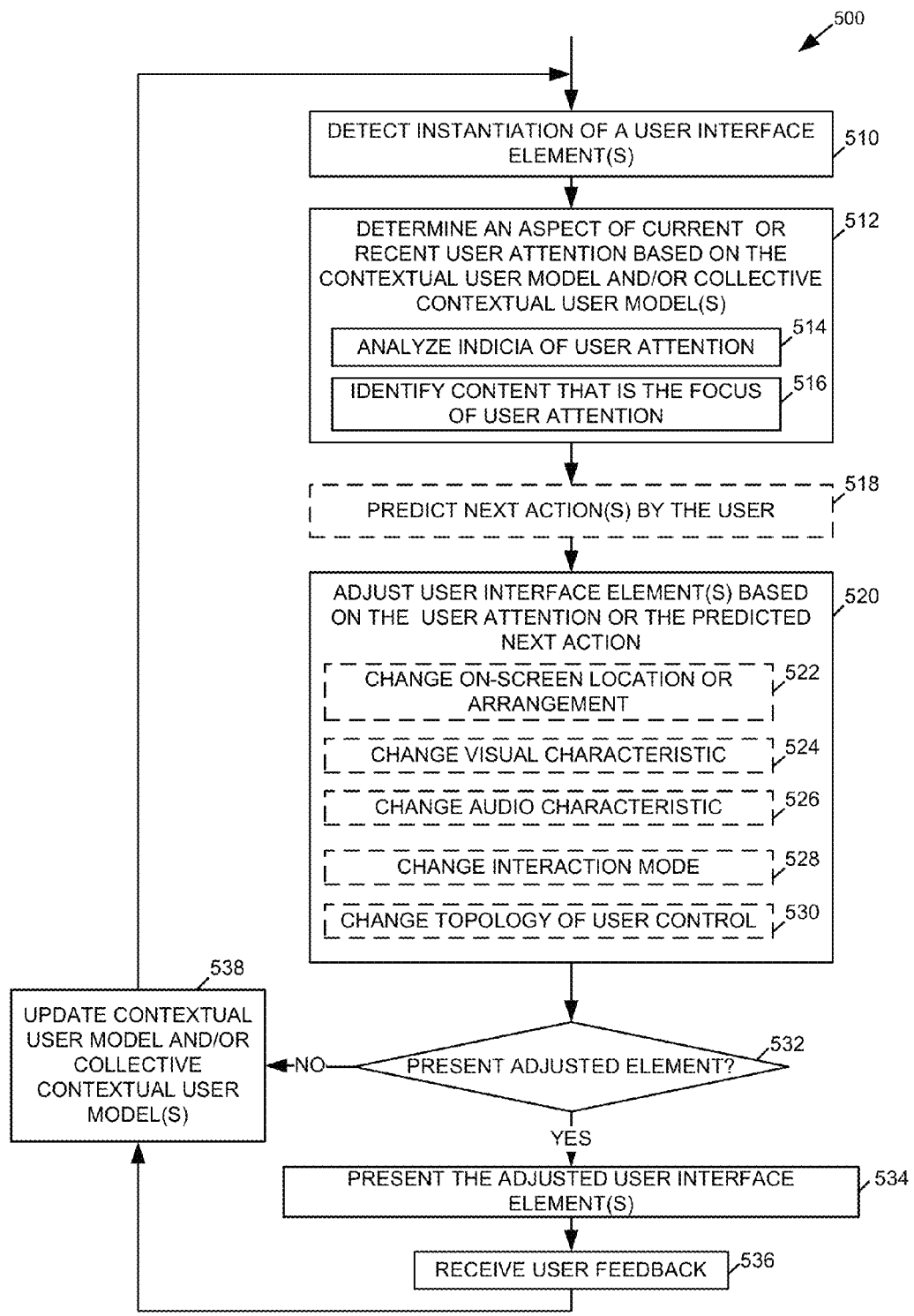
FIG. 5 is a simplified flow diagram for at least one embodiment of a method for adaptively presenting user interface elements based on a contextual model.

Referring now to FIG. 5, an illustrative method 500 executable as computerized programs, routines, logic and/or instructions by one or more of the various modules and/or components of the system 20, to adapt the presentation of user interface elements based on the contextual user model 180, is shown. At block 510, the method detects the instantiation of a user interface element (or a combination or sequence of user interface elements) by an application 100. Meanwhile, a gaze-tracking system may be continuously monitoring changes in the user's gaze as it relates to various on-screen locations, at block 512. This process may determine the degree to which the user's attention is focused on particular areas of the display at given points in time (block 514) and identify content displayed in areas of the display that have received the user's attention (block 516). So, when a user interface element (or combination or sequence of such elements) is instantiated at block 510, the method 500 can assess the degree to which the user interface element(s) may be relevant to the user's current interaction context. Based on this assessment, the method 500 may invoke the input acceleration module 250 to predict a next action (or sequence of actions or "workflow") (block 518). For example, the method 500 may go ahead and activate the instantiated user interface element(s) (at block 520) if it determines that the user is highly likely to do so given his or her current context.

Alternatively or in addition, the method 500 may adjust the user interface element(s) in one or more ways other than activating it. For example, the method 500 may change the on-screen location or arrangement of the user interface element(s) (block 522), e.g., by moving one or more of the user interface elements to a new location or rearranging a group of user interface elements including the instantiated element. As an example, the method 500 may automatically rearrange user interface elements so that a window that the user has been looking at for a period of time is displayed at a convenient location or with a larger font size. The method 500 may change a visual characteristic of the user interface element (block 524). For instance, the size or color of an interactive control may change in response to a determination by the system 20 that the user's hand seems to be moving toward that element (as determined via proximity sensors 105). The method 500 may change an audio characteristic of the user interface element(s) (block 526). For example, if the system 20 determines that the user is concentrating deeply on preparing work product in a word processing program, the method 500 may silence an otherwise audible notification. The method 500 may change the interaction mode of the user interface element(s) (block 528). That is, the method 500 may present the user interface element(s) in a different way depending on the user's context (e.g., an audible alert in place of a visual notification or vice versa). The method 500 may change the topology of a physical user control (block 530) in embodiments where such physical controls are dynamically adjustable (see U.S. patent application Ser. No. 13/399,210, Adaptable Actuated Input Device with Integrated Proximity Detection). In these and other ways, the system 20 strives to facilitate the user's productivity and enhance the user's overall interaction experience with the computing system 10.

In some embodiments, the method 500 uses automated reasoning techniques to determine whether to go ahead and present the adjusted user interface element, at block 532, before actually presenting it. For instance, if system 20 is uncertain about the user's current context (or has a lower degree of confidence in its analysis of the user's current interaction context), the method 500 may discard the adjusted user interface element or defer it to a later, more appropriate time. The method 500 receives or observes the user's active and passive responses to the various adjusted user interface elements (block 536). For example, the method 500 may record in the contextual user model 180 and/or one or more collective contextual user models 600 whether the user actually clicked on or simply ignored an adjusted user interface element. The method 500 may then return to block 510 and await the instantiation of another user interface element.

Figure 6:
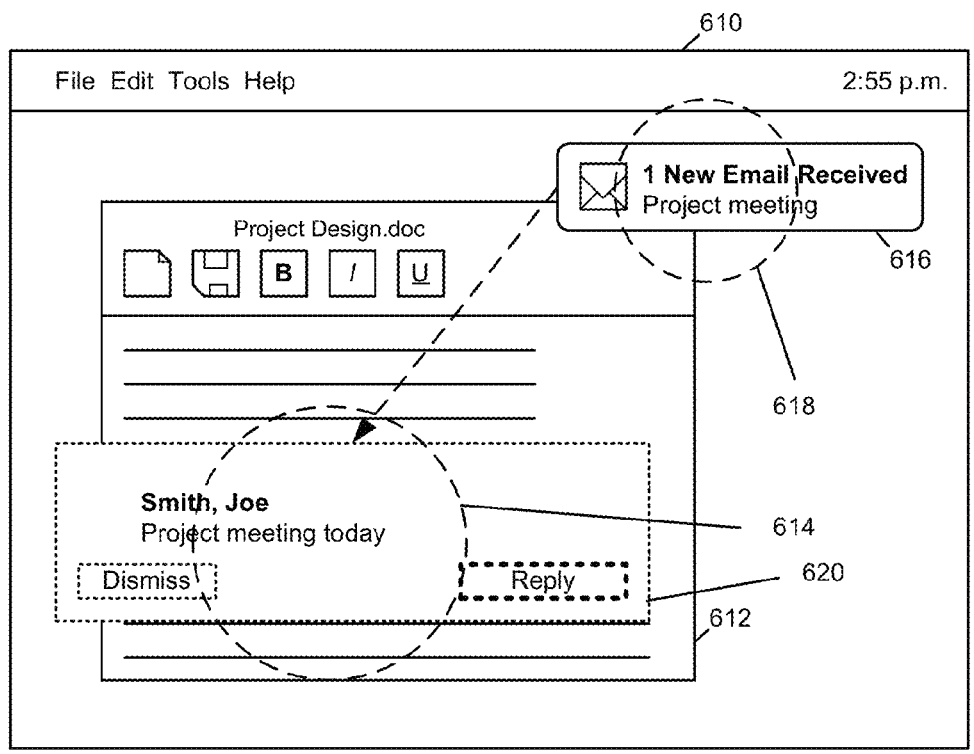
FIG. 6 is a simplified elevational view of an exemplary user interface that may be displayed in connection with the method of FIG. 5.

Referring now to FIG. 6, an exemplary user interface display 610 is shown. The illustrative display 610 is at least a portion of a display screen of a computing device and includes a graphical user interface. At the outset, the user's visual attention is directed at area 614. For example, the user may be reading and/or preparing a document 612, e.g., "Project Design.doc." Next, an email notification 616 is received and is initially displayed in an area of the display 610 that is outside of the user's current visual focus. The user's gaze shifts to area 618 in response to the notification 616. Based on the duration of the user's attention to the notification 616 and/or other factors (e.g., the relevance of the notification the user's current interaction context, as may be determined from the contextual user model 180), the adaptive presentation module 260 relocates the notification 616 to the area 614 and changes the interaction mode of the notification 616 to an interactive control 620, which reveals the sender of the message, the subject, and an selectable button to allow the user to immediately reply to the message, if desired. In some embodiments, the adaptive presentation module 260 may adjust the presentation of the notification 616 based on its perceived relevance to the user's current interaction context and without regard to the gaze-tracking data. For instance, the adaptive presentation module 260 may be aware that the subject of the notification 616 relates to the work that the user is currently doing in the document 612, based on the contextual user model 180, and automatically bring the notification 616 to the user's attention, accordingly.

Cognitive Context-Based Automated Information Discovery

Whereas input accelerator module 250 automatically suggests next actions that are likely to be helpful in completing inferred user tasks, discovery module 270 automatically identifies relevant content whose discovery is likely to assist in the user's inferred activities. As background, note that pending U.S. patent application Ser. No. 13/182,245 (Method and Apparatus for Assembling a Set of Documents Related to a Triggering Item), Ser. No. 13/149,536 (Method and Apparatus for User Modelization), and Ser. No. 12/632,491 (Electronic Assistant) describe various methods and techniques for automatically identifying and presenting documents and materials of likely relevance and usefulness to a user, including in an observed or inferred situation or context. In some embodiments, discovery module 270 leverages semantic information in contextual user model 180 about what the user is currently doing and seeing in order to infer the most pertinent aspects of the user's current context, and can then utilize a variety of search and information retrieval technologies in order to identify highly relevant material of likely usefulness in light of those pertinent aspects.

For example, discovery module 270 may glean from contextual user model 180 that a user has very recently been looking carefully at portions of several different documents—e.g. email messages, locally stored documents, web pages—and analysis of those specifically viewed portions reveals that the user appears to be particularly interested in certain keywords and/or topics. (Said analysis may be performed, for example, using semantic classification algorithms such as referenced in the above-cited patent applications, and/or other information retrieval algorithms known to practitioners of the relevant arts.) Discovery module 270 then automatically initiates a search for material relevant to the intersection of the identified keywords and/or topics of strong interest, potentially including searches of the public internet (e.g. using a conventional search engine), the user's local (e.g. desktop) storage, the user's personal cloud data, enterprise/intranet sites, electronic libraries, and/or other available information repositories. The most relevant results of this search, as ranked by discovery module 270, are then presented to the user for consideration, e.g. in a display of interactive thumbnails as described above in connection with an exemplary embodiment of input accelerator 250 and step 440 of FIG. 4. In some embodiments, this display of suggestions is unobtrusive, such that the user can browse it if desired, but otherwise creates minimal interference with the user's work. In this regard, one approach is to leverage the gaze-tracking information delivered by user sensor 103 and captured in model 180, and to dynamically increase or reduce the size, centrality, or prominence of the suggestions depending on where and how intently the user's gaze is focused. In further embodiments, based on the user's implicit or explicit feedback—e.g. selection and sustained viewing (or not) of particular suggested content—module 270 can dynamically modify its model of what topics, words and/or other criteria currently interest the user, for example in a manner analogous to the handling of feedback as described in U.S. pending application Ser. No. 13/149,536 referenced above.

Figure 7:
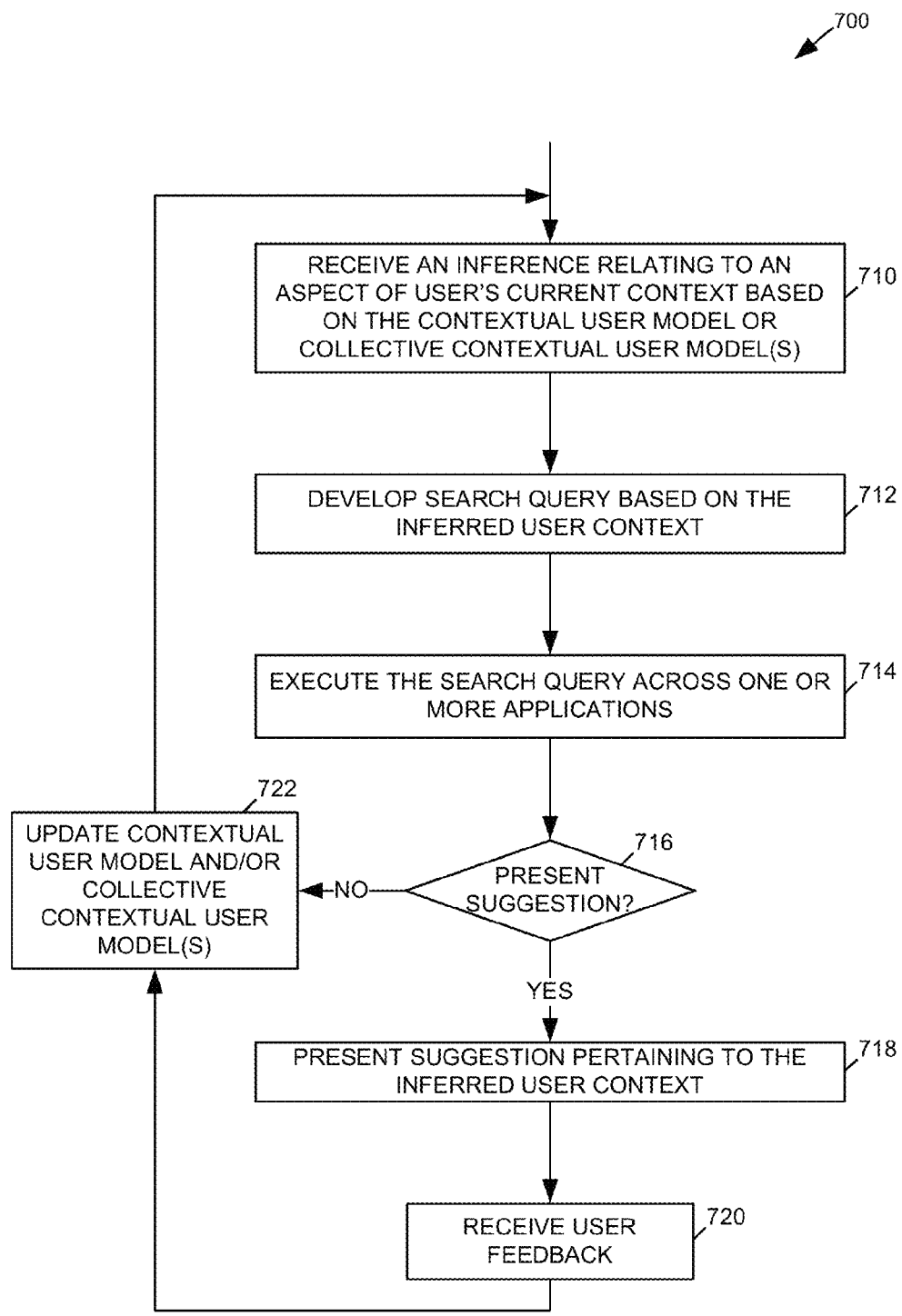
FIG. 7 is a simplified flow diagram for at least one embodiment of a method for discovering information in an automated fashion based on a contextual user model.

Referring now to FIG. 7, an illustrative method 700 executable as computerized programs, routines, logic and/or instructions by one or more of the various modules and/or components of the system 20, to discover information in an automated fashion based on the contextual user model 180, is shown. With the inference engine 185 more or less continuously assessing the user's current interaction context as described above, the method 700 receives an inference therefrom at block 710. The inference may be drawn from the user's own personal contextual model 180 or one or more collective contextual user models 600 to which the user belongs. Using the inference, the method 700 automatically (e.g., without initiation by the user) formulates a computer-executable search query using conventional query development techniques, and executes the search query using conventional information retrieval techniques (where any of such techniques may be selected according to the requirements or design of a particular implementation of the system 20, and may be now known or later-developed) (blocks 712 and 714). As noted above, the search may be executed across multiple software applications. For example, the method 700 may search the user's email folders and also conduct a search across various data sources (web sites, etc.) accessible via the Internet, to find information that may be pertinent to the current interaction context. Blocks 716, 718, 720, and 722 operate in a similar fashion to blocks 532, 534, 536, and 538 described above. The method 700 determines, based on the user's current interaction context, whether to go ahead and present a suggestion containing one or more results of the executed search query (block 716), presents the suggestion (block 718), receives active or passive user feedback (block 720) and updates the user's contextual model 180 and/or one or more collective contextual models 600 to which the user belongs (block 722) with information about the user's interactions (or lack thereof) following the presentation of the suggestion, or, in the case where the method 700 does not present a suggestion, with information about the interaction context in which the suggestion was not offered. Following block 722, the method 700 returns to block 710 and awaits the receipt of another inference from the inference engine 185.

Cognitive Indexing and Searching

In some embodiments, the system includes a cognitive indexing and cognitive-contextual search module 280, allowing users to make "workflow"-based search queries. As used herein, "cognitive indexing" refers to the indexing of content in a searchable body of content (e.g., corpus) in cognitive, user-level terms; that is, with respect to cognitive events that are meaningful to the user. For example, based on the interaction data contained in the contextual user model 180, a recently viewed article may be indexed with terms such as "read after the meeting about memory," or "downloaded after email from Phil." Similarly, a recently-edited document may be indexed with terms such as "edited while in San Francisco, after attending the conference on memory." Cognitive-contextual search module 280 can then use such indexing to productively conduct searches for information in response to queries that contain such loose cognitive associations or contextual references.

As used herein, "workflow" refers to a sequence, combination, or series of events and/or interactions that have occurred over the course of the user's existence with reference to one or more computing devices and about which the system 20 is knowledgeable. In other words, "workflow" typically implies a temporal component in connection with an interaction or series of interactions. The cognitive-contextual or workflow-based search capability enables retrieval of desired information based on queries that specify a combination of data characteristics (e.g. keywords, metadata) and a history of user interactions related to the desired information. The capability is provided across multiple different applications, both with respect to the body of information that can be searched as well as the types of user interactions that can be referenced. Moreover, the ability to retrieve based on specified user interactions includes an ability to specify the user's broader context with respect to the specified interactions, e.g. when, where and in what context the user performed a specified interaction and/or previously accessed the relevant data. This cognitive-contextual or workflow-based search capability provides quicker, faster and more intuitive search for information that a user has forgotten but can describe with "anecdotal" contextual information.

Some illustrative examples of cognitive-contextual or workflow-based searches:
"What documents did I view shortly after I read Joe's email about transparent keyboards?"
"What articles have I read recently about the Patent Reform Act?"
"What websites have I visited recently that were recommended to me by email?"
"I'm looking for a document about image compression that Joe sent me"
"I'm looking for the article about memory that I read on my iPad while I was out of town"
"Find the book reading event of the author of the book that I came across after I read the email from my colleague that mentioned metaphors in behaviors."

In an exemplary embodiment, search module 280 helps deliver this capability by indexing and relating pieces of information to each other via high-level descriptions of user interactions that have occurred with respect to such information. Search module 280 thus records the evolution of information over time through high-level user actions. Consequently, information that is accessed and interacted with can subsequently be retrieved by the user based on a specification, from the user's perspective, of prior interactions relevant to the desired information.

Another feature that is facilitated by search module 280 involves multi-modal tracking of a user's context. In other words, the system records (in contextual user model 180 and/or elsewhere) when, where, and in what context the user performs various actions. For example, through recording the user's current geographical location information, as well as tracking the user's gaze and activities, the system can retrieve information based on where the user was located and what time it was when certain information was previously viewed and/or when certain interactions took place, as well as what else the user might have looked at or seen around the same time, and what other salient things were present in the user's context at the time. Because this stored representation of historical information relates information/data to a user's actions and the user-level context of such actions, search queries (such as the examples listed above) can be answered that are more closely related to the real-world experience of the user.

As noted above, in some embodiments, entries in contextual user model 180 can be probabilistic. This probabilistic nature can be exploited when answering queries, e.g., by presenting multiple, alternative responses to queries that are ranked or prioritized based on the probabilities assessed by the system. For instance, consider the example query listed above: "What documents did I view shortly after I read Joe's email about transparent keyboards?" If the user viewed such an email on multiple occasions or received multiple emails matching that description, search module 280 can consider probabilities associated in contextual user model 180 with each of the recorded viewings—e.g., perhaps on a certain occasion the user only briefly glanced at the message and so is arguably less likely to have retained a strong memory of that occasion—and can rank or filter the responsive documents accordingly.

Figure 8:
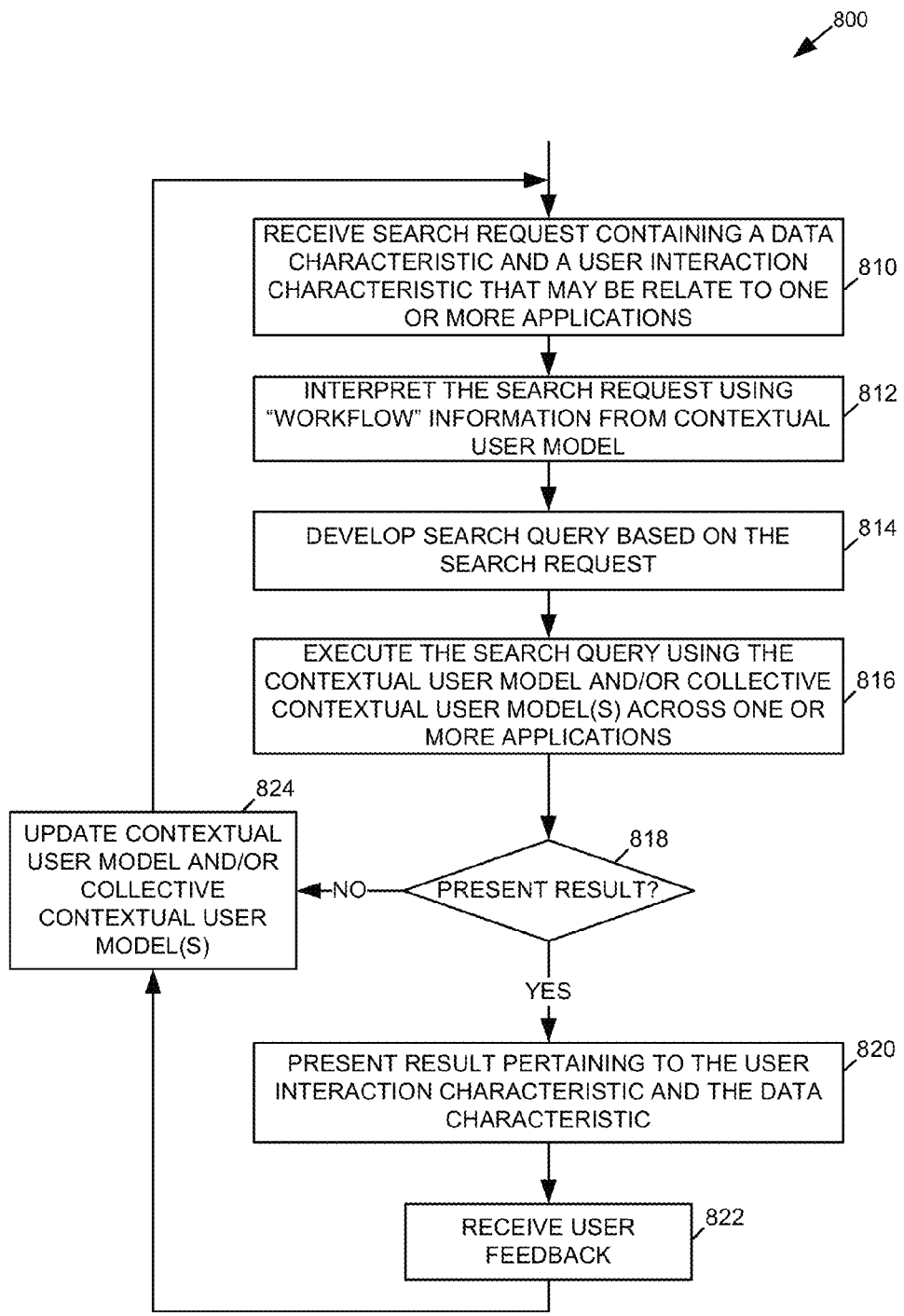
FIG. 8 is a simplified flow diagram for at least one embodiment of a method for conducting a search based on a contextual user model.

Referring now to FIG. 8, an illustrative method 800 executable as computerized programs, routines, logic and/or instructions by one or more of the various modules and/or components of the system 20, to conduct user-initiated searching based on a contextual user model 180, is shown. Here, rather than automatically formulating and executing search queries based on the user's current interaction context as in the method 700, the method 800 is initiated by user input that it interprets as a search request. As noted above, the types of search requests that can be handled by the method 800 include contextual (e.g., temporal) and/or interaction-related details that are more or less loosely associated with material the user desires to retrieve, as the user may normally use them to recall such an item. In this way, the method 800 strives to simulate normal human brain activity that occurs when a person attempts to remember or locate information.

At block 812, the method 800 interprets the user's search request using the contextual user model 180 and/or one or more collective contextual models 600 to which the user belongs. That is, vague or ambiguous references such as "before the meeting" may be resolved by determining, e.g., from the semantic descriptions of the user's recent interactions with a calendar application stored in the user model 180, when the user last attended a meeting. Similarly, loose references to people, places, or things, such as "the message from Phil" can be resolved by the method 800 through a review of the user's recent interactions with an email application, which are stored in the user model 180. In other words, the method 800 maps the elements of the search request (e.g. data characteristics and interaction characteristics) to semantic descriptions contained in the user model 180. At block 814, the method 800 develops a computer-executable search query using both the user-supplied search request and the contextual details gleaned from the user model(s) 180, 600 at block 812.

Blocks 816, 818, 820, 822 and 824 operate in a similar fashion to blocks 714, 716, 718, 720 and 722 described above. The method 800 executes the search query using conventional information retrieval techniques (where any of such techniques may be selected according to the requirements or design of a particular implementation of the system 20, and may be now known or later-developed) (block 816). The method 800 determines, based on the user's current interaction context, whether to go ahead and present a suggestion containing one or more results of the executed search query (block 818), presents the suggestion (block 820), receives active or passive user feedback (block 822) and updates the user's contextual model 180 and/or one or more collective contextual models 600 to which the user belongs (block 824), with information about the user's interactions (or lack thereof) following the presentation of the suggestion, or, in the case where the method 800 does not present a suggestion, with information about the interaction context in which the suggestion was not offered. Following block 824, the method 800 returns to block 810 and awaits the receipt of another user-initiated search request.

Figure 9:
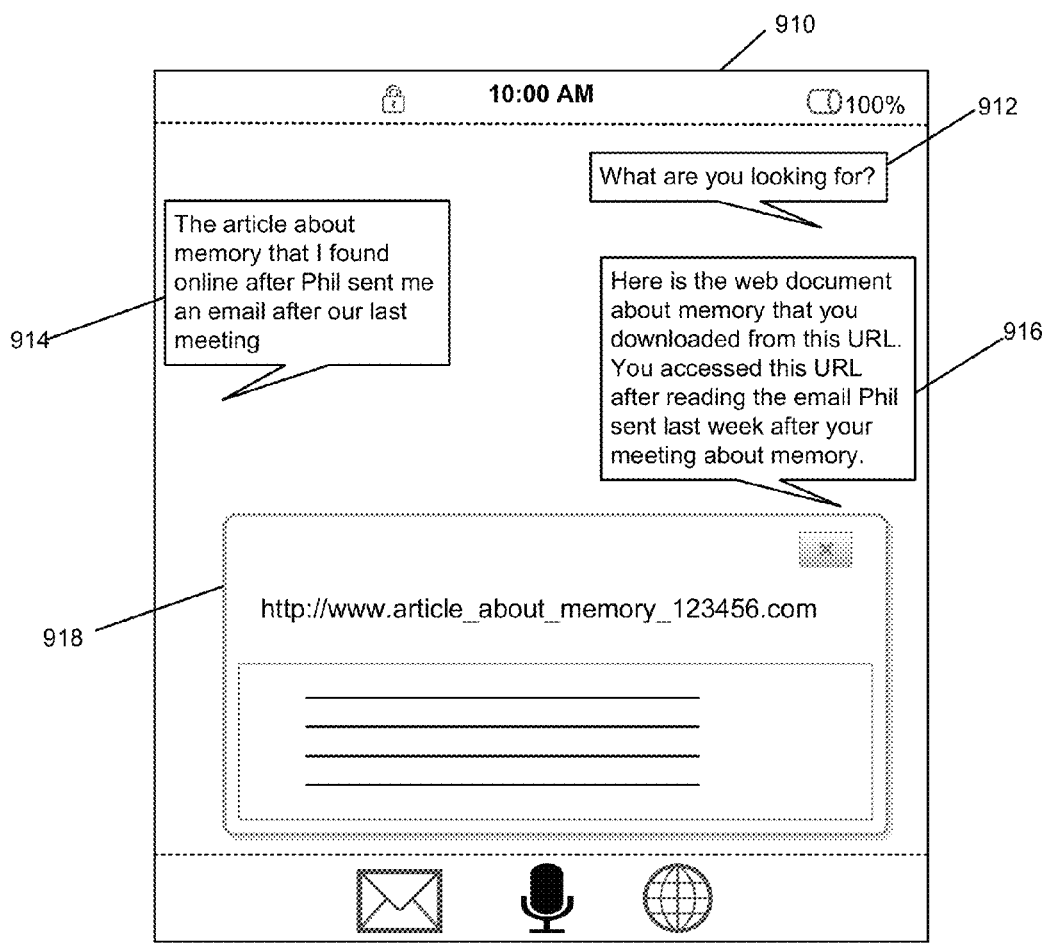
FIG. 9 is a simplified elevational view of an exemplary user interface that may be displayed in connection with the method of FIG. 8.

Referring now to FIG. 9, an exemplary user interface display 910 is shown. The illustrative display 910 is at least a portion of a display screen of a computing device and includes a natural language (e.g., voice or text) interface to the search module 280. In the illustrative embodiment, the system 20 prompts the user with a natural language question 912. In other embodiments, the system 20 may simply provide a more traditional search dialog box, or other mechanism for allowing the user to input a search request. The user responds with a natural language search request 912, which contains data characteristics ("the article," "about memory") as well as interaction characteristics ("I found online," "after Phil sent me an email," "after our last meeting"). The system 20 determines, from the contextual user model 180, the person who is most likely to be the "Phil" to which the user is referring, the date and time of the user's last meeting in which Phil was also an attendee (via, e.g., the user's calendar interactions), and any email messages received from Phil in the time period after the meeting (based on the user's email interactions). The illustrative system 20 responds to the search request 914 with a natural language reply 916 and presents the search result 918. As mentioned above, the system can make note of the user's response to the result 918; e.g., whether the user closes the dialog box clicks on the hyperlink, and store that interaction data in the user model 180.

Collective Contextual User Model

Figure 10:
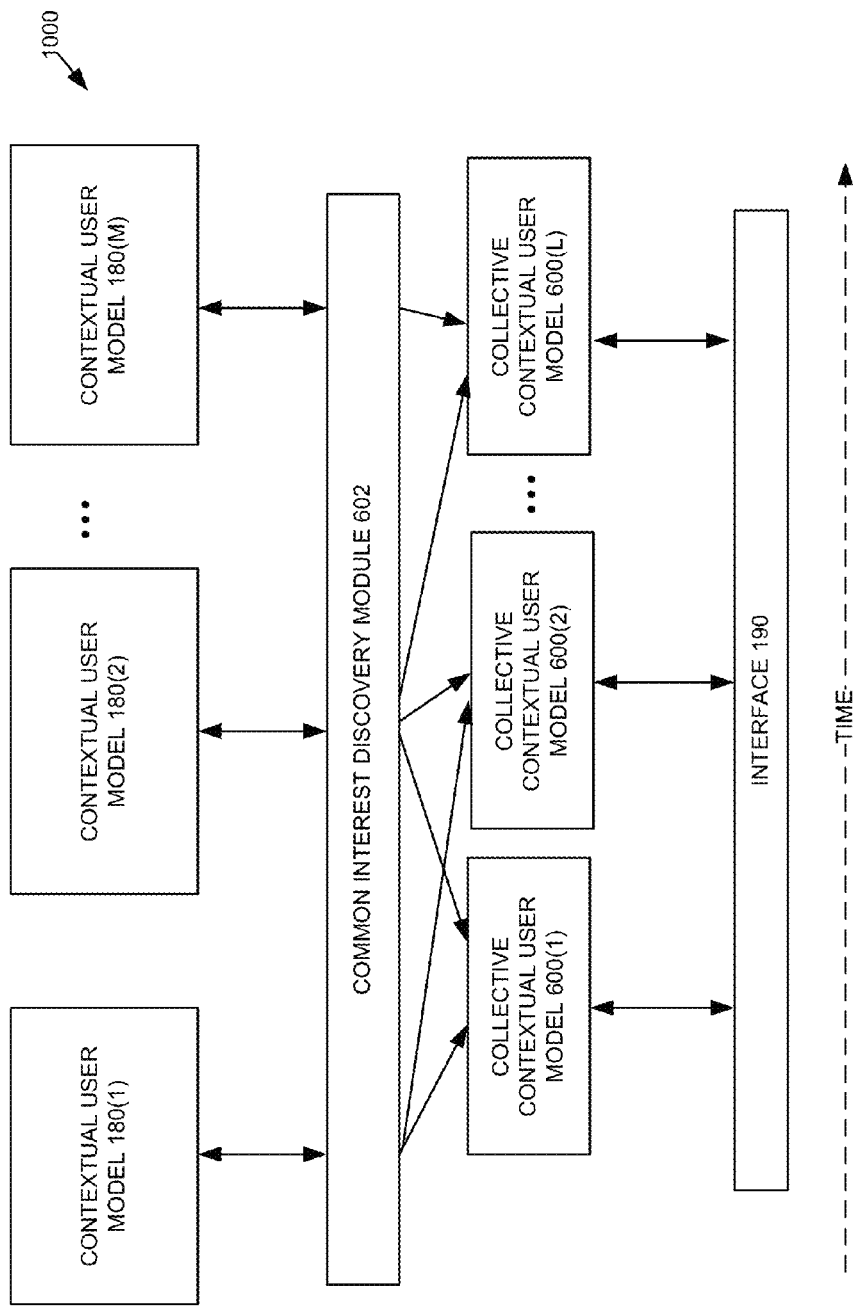
FIG. 10 is a simplified module diagram of at least one embodiment of a cross-application system for modeling passive and active interactions of multiple users in a computing system.

FIG. 10 depicts a system 1000 in which a collection 600(1) to 600(L) (where L is a positive integer) of contextual user models 180(1), 180(2), 180(M) (where M is a positive integer), corresponding to each of multiple collaborating users of the system 20, are analyzed as a group by a common interest discovery module 602. Results of such analysis are made available to users and/or other applications or computer processes by the interface 190 and/or the content discovery module 270, for example. Through, e.g., the interface 190 and/or content discovery module 270, the system 1000 can provide insight and advice to, for example, an executive who is responsible for leading or managing the group of collaborating users, by providing a high-level summary and/or analysis of what the various users are seeing and doing. The common interest discovery module 602 leverages semantic information in the individual contextual user models 180(1) to 180(M) to infer relations and connections among the users and their respective activities, and creates collective contextual user models 600(1) to 600(L) as needed or desired as it learns those relations and connections. Through the interface 190 and/or the content discovery module 270, the system 1000 can bring these relations and connections to the attention of individual users if that seems relevant to their context (e.g., bringing knowledge, actions, or inferred goals of one user to the attention of another user). Discovery of intersecting areas of current interest among a group of skilled team members can thus be facilitated.

For example, in a group of collaborating researchers or analysts, interface 190 and/or content discovery module 270 can share with other team members, and/or with a supervisor, a shared reading record 615 of what specific material has been viewed and focused on by other members of the team. The shared reading record 615 facilitates noticing any gaps in coverage, assessing how thoroughly a body of material has been reviewed, minimizing needlessly redundant effort, and/or calling attention to areas that have attracted the interest of multiple team members. Because a collective contextual model 600 can reflect not just which specific portions of content were viewed, but also with what degree of attention and focus (how long each such portion was actually viewed, etc., as described above), interface 190 and/or content discovery module 270 (and/or a human reviewer) can draw inferences regarding whether a given portion of content was actually read and likely understood, and whether it was given sufficient attention by a user or by the group for purposes of comprehension. These capabilities are similarly valuable for purposes of education and training, e.g., by providing a teacher with better data as to how thoroughly students have read particular material, and to infer whether various portions seem to be requiring and/or receiving greater or lesser effort from students. In some embodiments, learning goals are specified and individual and/or group contextual user models can be compared to learning goals, in order to facilitate automated reasoning about learning progress and adaptation of learning/training content, for example.

Figure 11:
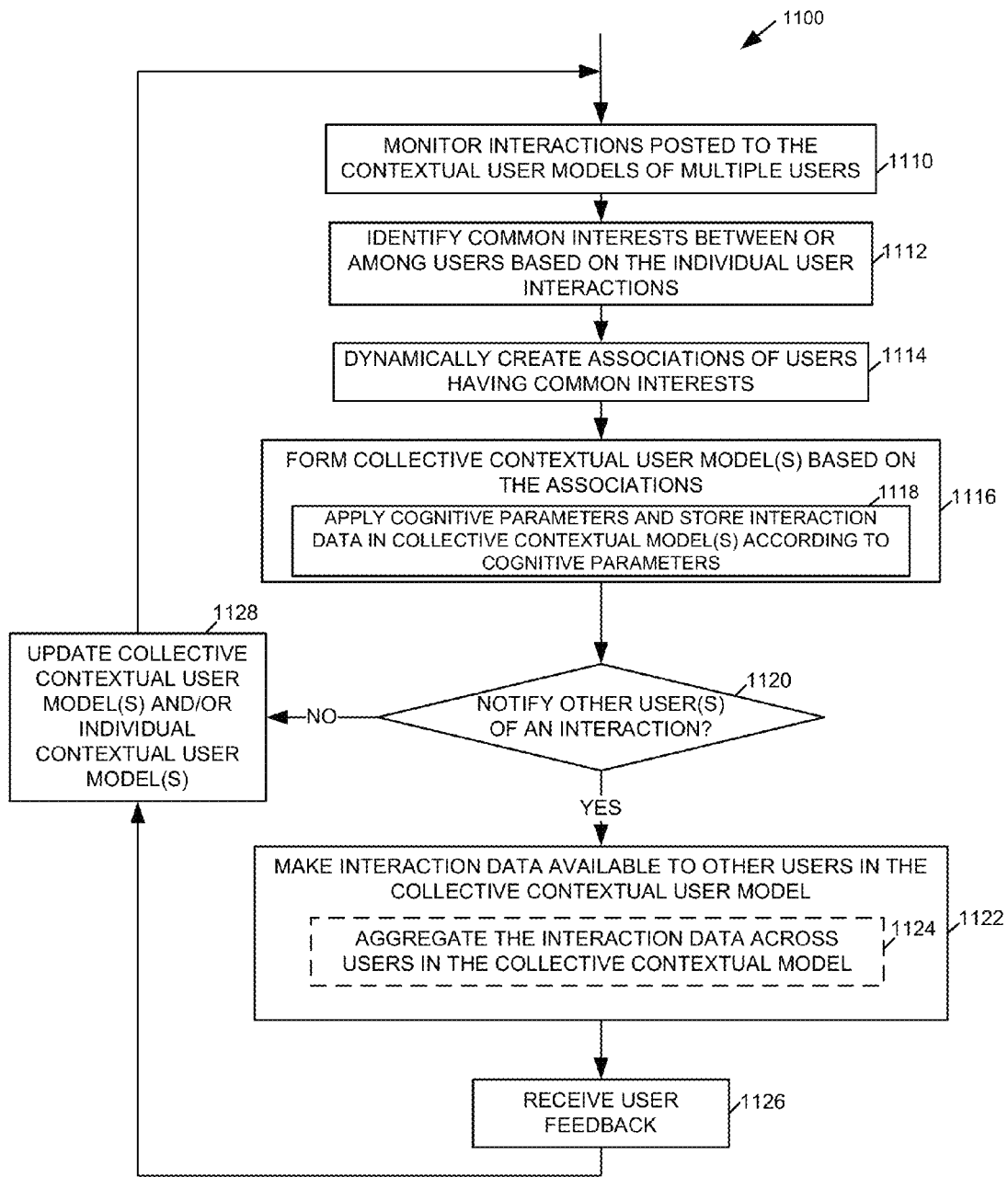
FIG. 11 is a simplified flow diagram for at least one embodiment of a method for developing a collective contextual user model that may be used in connection with the system of FIG. 10.

Referring now to FIG. 11, an illustrative method 1100 executable as computerized programs, routines, logic and/or instructions by one or more of the various modules and/or components of the system 20, to develop and maintain collective contextual user models, is shown. The method 1100 periodically or continuously (e.g., as a background process) monitors interaction data that is posted to the individual user models 180 that are part of the system 20, over time (block 1110). The method 1100 reviews the interaction data across multiple user models 180 to identify common interests between or among the various users of the system 20 (block 1112) and then dynamically creates associations among the users determined to have such common interests. For example, interaction data relating to email correspondence may reveal that a group of users are currently engaged in preparing a patent application, and thus these users may be associated with each other for purposes of a collective contextual model, at least temporarily. Once the patent application is prepared and filed, there may be no further need for the collective contextual model, and so the associations and the resulting collective model may be discontinued thereafter.

At block 1116, a collective contextual model as described above is formed autonomously by the system 1000, based on the associations created at block 1114. In some embodiments, the collective model may be formed by copying material from the relevant individual user models 180 to a new location. In other embodiments, the collective model may exist by virtue of references (e.g., pointers or meta data) associated with the interaction data entries in the relevant individual user models. In the illustrative embodiments, the collective contextual models are designed to have a similar structure as the user model 180 described above. That is, each collective model may include pre-cognitive content, short term memory, long term memory, and/or persistent memory, as described above. The method 1100 applies the cognitive and/or locomotive parameters to the collective interaction data and stores the interaction data in the corresponding subarea (e.g., pre-cognitive, short-term, or long-term) in the collective contextual model, at block 1118.

Blocks 1120, 1122, and 1124 relate to the ability of the system 1000 to proactively or upon request provide collective interaction data or analyses thereof to other applications and/or users of the system 1000, as described above. Block 1120 executes logic to determine whether to make other users of a collective model aware of an interaction recently received into the collective model. For example, if one user of a group recently received an email containing an article that the system 1000 knows relates to the group's common interest, the method 1100 may go ahead and autonomously forward that email to the other members of the collective model at block 1122. At block 1124, the interaction data of the users of a collective model may be aggregated and collectively analyzed as described above (e.g., a reading record), before the information is made available via the interface 650. Feedback from the several users of a collective model can be received, analyzed, and incorporated into the collective model and/or individual user models in a similar fashion as described above, at blocks 1126 and 1128, and the method 1100 may return to block 1110 to continue monitoring the collective interaction context across the system 1000.

Figure 12:
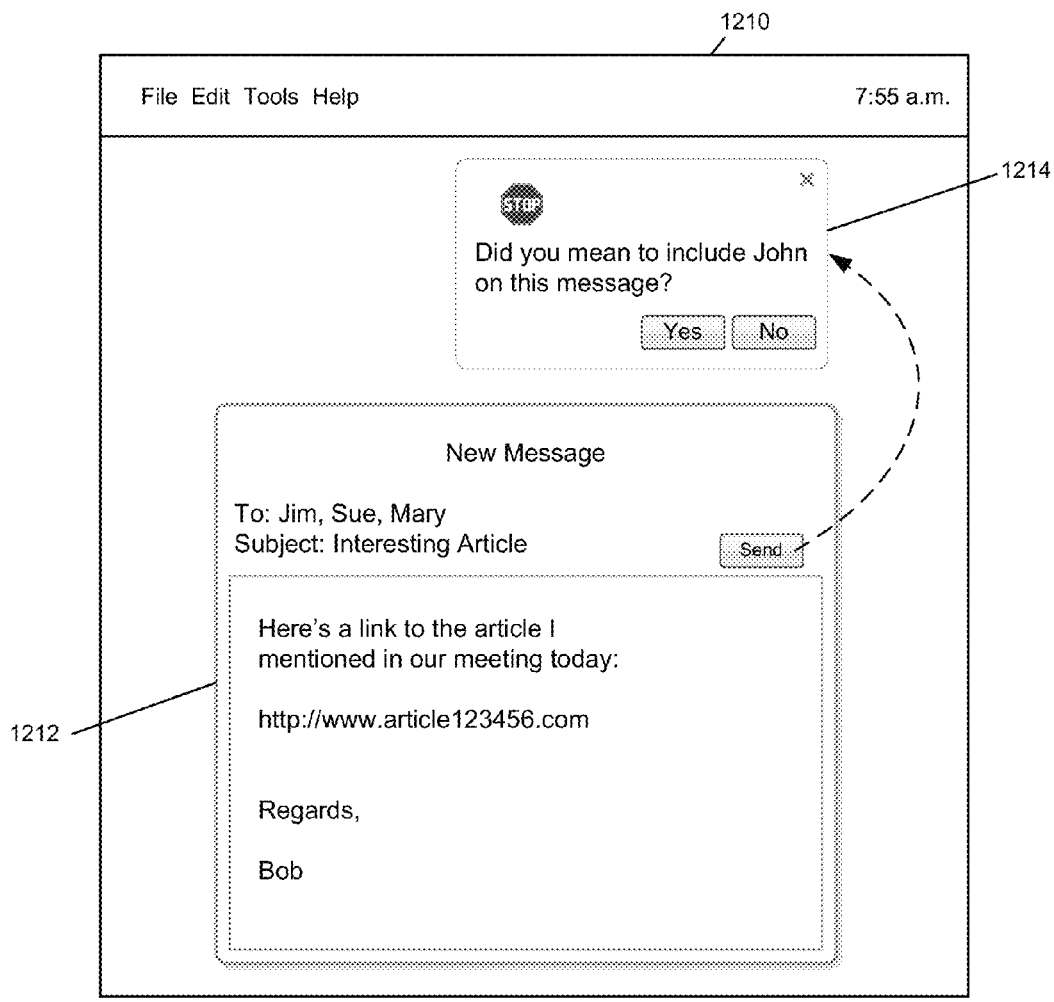
FIG. 12 is a simplified elevational view of an exemplary user interface that may be displayed in connection with the system of FIG. 10.

Referring now to FIG. 12, an exemplary user interface display 1210 is shown. The illustrative display 1210 is at least a portion of a display screen of a mobile computing device and may include a touch-sensitive display or touch screen. In this example, a user has prepared an email message 1212 forwarding an article to other members of a project team, but may have inadvertently forgotten to add one of the team members as an addressee. Using the collective contextual model formed by the system 1000 based on the system 1000 having determined that the user, Jim, Sue, Mary, and John have a common interest, the system 1000 interrupts the "email send" application event to ask the user whether he or she also intended to include John as an addressee, via a notification 1214. The exemplary notification 1214 is interactive in that the user can select "Yes" to return to the email message and edit the addressee information, select "No" to continue sending the message to only Jim, Sue, and Mary, or simply ignore the notification by closing it. In some embodiments, the system may automatically insert John's email address into the addressee field (using, e.g., input acceleration module 250) if the user selects "Yes."

IMPLEMENTATION EXAMPLES

In an exemplary embodiment, the user interacts with the system 20 through an interactive computing device such as a desktop computer, workstation, portable computer, or mobile computing device. In some embodiments, user sensor(s) 103 are integrated in the user's computing device. In some embodiments, the user's device includes adaptable input/output facilities as described e.g. in pending U.S. patent application Ser. No. 13/158,109 (Adaptable Input/Output Device), while in other embodiments the user's device may comprise a more conventional interactive computing device.

Portions of the system 20 and/or the system 1000 may be implemented in software, firmware, and/or hardware as one or more logical modules or routines that are executable by a computing device or system, which in some embodiments may be the same device with which the user locally interacts, or may comprise a physically separate computing resource in communication with the user's interactive device (e.g. one or more remote, "cloud"-based computer servers). In some embodiments, one or more portions of the system 20 and/or the system 1000 may be implemented as integrated components of framework 110. Storage for the various components of contextual user model 180 may be local to the user's interactive computing device, physically separate and/or remote, or a combination. In some embodiments, access to contextual user model 180 may be shared across multiple user devices—for example, the user model may incorporate and reflect activities conducted on a primary desktop machine as well as on one or more portable devices of a given user. In some embodiments, a version of user model 180 can be maintained on each of a user's separate devices, and periodically synchronized as logistics permit (connectivity etc.).

In some embodiments, the application 100 can also be executed in a legacy system environment, where elements such as framework component 110 and contextual user model 180 are not present. This can be readily achieved by coding application 100 to detect the absence of the requisite elements, in which case application 100 generally executes in the usual manner but does not perform the operations that prepare and post semantic descriptions into contextual user model 180.

Figure 13:
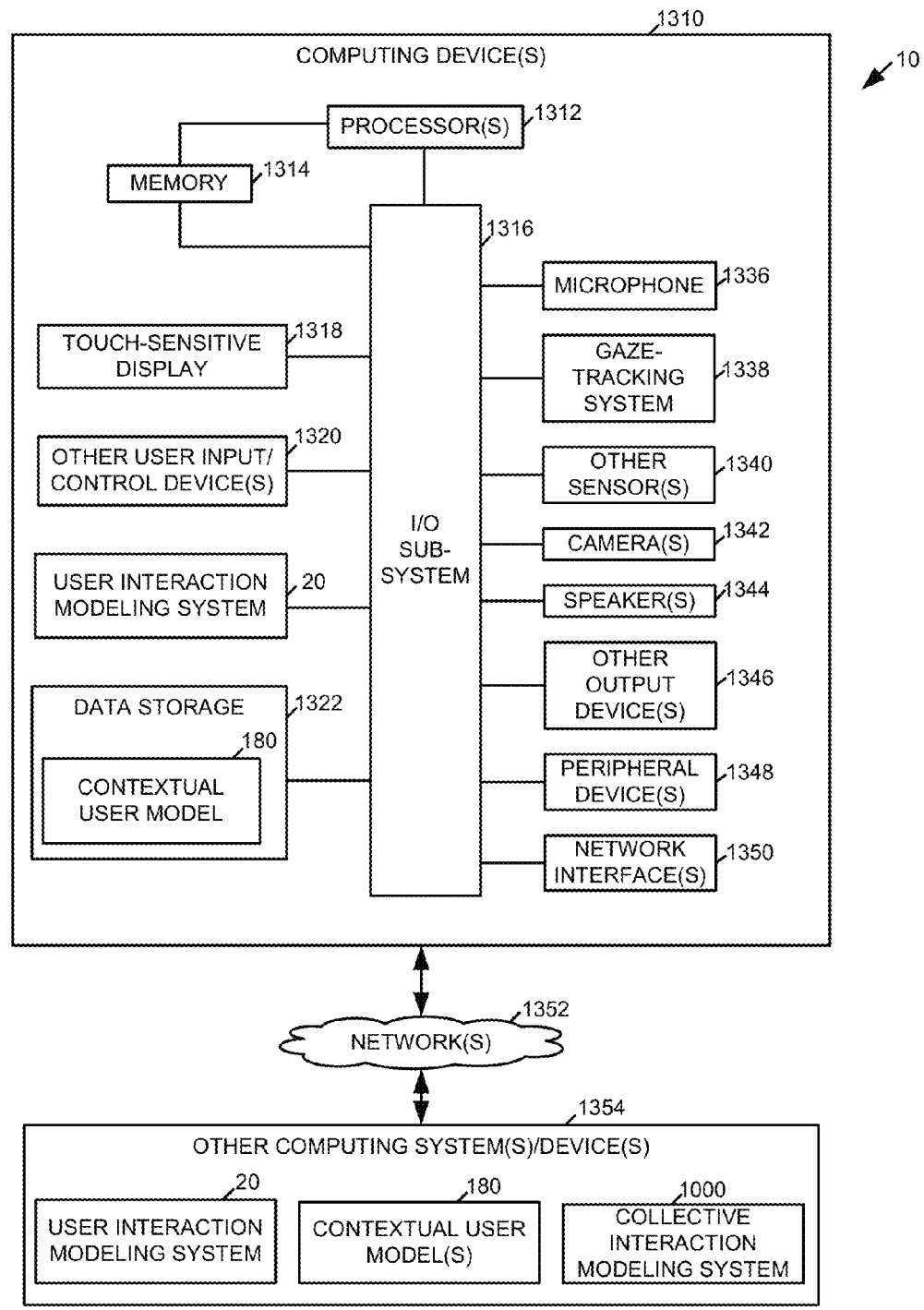
FIG. 13 is a simplified block diagram of an exemplary computing system in connection with which at least one embodiment of the system of FIG. 1 and/or FIG. 9 may be implemented.

As illustrated in FIG. 13, portions of the system 20 and contextual user model 180 are embodied in a computing device 1310. Portions of the system 20, the user model 180, and/or portions of the collective interaction modeling system 1000 (including any one or more of the collective models 600) may be distributed across multiple computing devices 1310, 1354 connected via one or more networks 1352.

The illustrative computing device 1310 includes at least one processor 1312 (e.g. microprocessor, microcontroller, digital signal processor, etc.), memory 1314, and an input/output (I/O) subsystem 1316. The processor 1312 and the I/O subsystem 1316 are communicatively coupled to the memory 1314. The memory 1314 may be embodied as any type of suitable computer memory device (e.g., volatile memory such as various forms of random access memory).

The I/O subsystem 1316 is communicatively coupled to at least one touch-sensitive display 1318 (e.g., a touchscreen, virtual keypad, etc.), a microphone 1336, one or more other input or user control devices 1320 (e.g., a physical keyboard or keypad, buttons, hardpanel controls, tactile or haptic interface, etc.), at least one data storage 1322, a gaze-tracking system 1338, one or more other sensors 1340 (e.g., any of the aforementioned sensors), one or more still and/or video cameras 1342, one or more audio speakers 1344, other output devices 1346 (e.g., an LED, display screen, etc.), one or more other peripheral devices 1348 (e.g., GPS or other location service transceiver, sound, graphics or media adaptors, etc.), and at least one network interface 1350.

The data storage 1322 may include one or more hard drives or other suitable data storage devices (e.g., flash memory, memory cards, memory sticks, and/or others). Portions of the system 20 and/or the user model 180 may reside at least temporarily in the data storage 1322 and may be copied to the memory 1314 during operation, for faster processing or other reasons.

The network interface 1350 communicatively couples the computing device 1310 to one or more other computing systems or devices 1354 via the networks 1352. The network(s) 1352 may include a local area network, wide area network, personal cloud, enterprise cloud, public cloud, and/or the Internet, for example. Accordingly, the network interface(s) 746 may include a wired or wireless Ethernet, mobile/cell network, WI-FI, BLUETOOTH, VPN, or NFC adapter or other suitable interface devices as may be needed, pursuant to the specifications and/or design of the particular networks 1352. The other device(s) 1354 may be embodied as any suitable type of computing device such as, for example, a server, an enterprise computer system, a network of computers, a combination of computers and other electronic devices, a mobile device, any of the aforementioned types of computing devices, or other electronic devices.

The computing device 1310 may include other components, sub-components, and devices not illustrated in FIG. 13 for clarity of the description. In general, the components of the computing device 1310 are communicatively coupled as shown in FIG. 13 by one or more signal paths, which may be embodied as any type of wired or wireless signal paths capable of facilitating communication between the respective devices and components.

General Considerations

In the foregoing description, numerous specific details are set forth in order to provide a more thorough understanding of the present disclosure. It will be appreciated, however, that embodiments of the disclosure may be practiced without such specific details. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

In the drawings, specific arrangements or orderings of schematic elements may be shown for ease of description. However, the specific ordering or arrangement of such elements is not meant to imply that a particular order or sequence of processing, or separation of processes, is required in all embodiments.

In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

The foregoing disclosure is to be considered as exemplary and not restrictive in character, and all changes and modifications that come within the spirit of the disclosure are desired to be protected. Further, while aspects of the present disclosure may be described in the context of particular forms of electronic devices and systems, it should be understood that the various aspects have other applications, for example, in other electronic devices or in any application in which it is desired to improve or enhance the human-electronic device experience.

The invention claimed is:

1. A content discovery module to retrieve content in an automated fashion at a computing device, comprising executable instructions embodied in one or more non-transitory machine-readable media, configured to cause a computing system comprising one or more computing devices to:
   access a contextual user model, the contextual user model comprising:
      gaze-tracking data comprising one or more real-time sensor inputs indicative of user gaze in relation to on-screen locations of a display of the computing device; and
      semantic descriptions of user interface elements displayed at the on-screen locations corresponding to the gaze-tracking data, the semantic descriptions comprising information about the user interface elements;
   generate an inference relating to a user-specific current interaction context based on the contextual user model;
   formulate a search query including one or more aspects of the user-specific current interaction context;
   execute the search query across one or more software applications; and
   present one or more results of the search query at the computing device.

2. The content discovery module of claim 1, configured to determine, based on the gaze-tracking data, a plurality of recently-viewed user interface elements associated with a plurality of different software applications, determine search criteria based on one or more of the recently-viewed user interface elements, and formulate the search query using the search criteria.

3. The content discovery module of claim 2, wherein the recently-viewed user interface elements comprise an email message, a calendar appointment, an electronic document, or a web page.

4. The content discovery module of claim 1, configured to execute the search query across a plurality of networked computing devices.

5. The content discovery module of claim 1, configured to generate the inference based on a semantic description of a user interface element displayed at an on-screen location corresponding to the user gaze.

6. The content discovery module of claim 5, configured to incorporate at least a portion of the semantic description into the search query.

7. The content discovery module of claim 6, wherein the portion of the semantic description incorporated into the search query comprises a keyword or topic derived from the user interface element.

8. The content discovery module of claim 1, configured to generate the inference based on gaze-tracking data indicating a duration of user gaze at an on-screen location corresponding to a user interface element.

9. The content discovery module of claim 8 configured to incorporate into the search query at least a portion of a semantic description associated with the user interface element located at the on-screen location of user gaze.

10. The content discovery module of claim 1, configured to generate the inference based on gaze-tracking data indicating an intensity of user gaze at an on-screen location corresponding to a user interface element.

11. The content discovery module of claim 10, configured to incorporate into the search query at least a portion of a semantic description associated with the user interface element located at the on-screen location of user gaze.

12. The content discovery module of claim 1, configured to dynamically change the presentation of the results based on the user-specific current interaction context.

13. The content discovery module of claim 1, configured to present the results at an on-screen location corresponding to gaze-tracking data indicating a duration of user gaze.

14. The content discovery module of claim 1, configured to present the results at an on-screen location corresponding to gaze-tracking data indicating an intensity of user gaze.

15. The content discovery module of claim 1, configured to receive user feedback in response to a presented result and modify the presentation of results in response to the user feedback.

16. The content discovery module of claim 1, wherein the contextual user model comprises application event data from a plurality of software applications and semantic descriptions of the application event data, and the content discovery module is configured to incorporate into the search query at least a portion of a semantic description associated with the application event data.

17. A method for retrieving content in an automated fashion at a computing device, comprising:
maintaining a contextual user model, the contextual user model comprising:
gaze-tracking data comprising one or more real-time sensor inputs indicative of user gaze in relation to on-screen locations of a display of the computing device; and
semantic descriptions of user interface elements displayed at the on-screen locations corresponding to the gaze-tracking data, the semantic descriptions comprising information about the user interface elements;
generating an inference relating to a user-specific current interaction context based on the contextual user model;
formulating a search query including one or more aspects of the user-specific current interaction context;
executing the search query across one or more software applications; and
presenting one or more results of the search query at the computing device.

18. A computing system comprising:
a display;
a sensor subsystem to obtain gaze-tracking data, the gaze-tracking data being indicative of a user's gaze in relation to the display;
one or more processors; and
one or more machine-readable media having stored therein a plurality of instructions that when executed by the processor cause the computing system to perform the method of claim 17.

19. A cognitive contextual search module to retrieve content in response to user input at a computing device, comprising executable instructions embodied in one or more non-transitory machine-readable media, configured to cause a computing system comprising one or more computing devices to:
receive a search request comprising a data characteristic and a user-specific interaction characteristic;
access a contextual user model, the contextual user model comprising:
gaze-tracking data comprising one or more real-time sensor inputs indicative of a person's gaze in relation to on-screen locations of a display of the computing device; and
semantic descriptions of user interface elements displayed at the on-screen locations corresponding to the gaze-tracking data, the semantic descriptions comprising information about the user interface elements;
perform a search based on the search request and based on the contextual user model to obtain one or more search results; and
present the search results at the computing device.

20. The search module of claim 19, wherein the data characteristic relates to a software application and the interaction characteristic relates to a different software application.

21. The search module of claim 19, configured to interpret the search request using one or more of the semantic descriptions from the contextual user model.

22. The search module of claim 19, wherein the data characteristic comprises a keyword or meta data and the interaction characteristic comprises a reference to a prior user-specific interaction.

23. The search module of claim 22, configured to map the reference to a prior user-specific interaction to a semantic description contained in the contextual user model.

24. The search module of claim 19, configured to searchably index a plurality of content with prior interaction information from the contextual user model.

25. The search module of claim 24, wherein the searchably indexed content comprises content from a plurality of software applications.

26. The search module of claim 24, wherein the searchably indexed content comprises content located on a plurality of networked computing devices.

27. The search module of claim 19, configured to dynamically change the presentation of a search result based on the gaze-tracking data.

28. The search module of claim 19, configured to execute the search query across a plurality of software applications at the computing device.

29. The search module of claim 19, configured to receive user feedback in response to a presented search result and modify the presentation of the search result in response to the user feedback.

30. The search module of claim 19, wherein the contextual user model comprises application event data from a plurality of software applications and semantic descriptions of the application event data, and the search module is configured to interpret the search request based on a semantic description associated with the application event data.

31. A method for retrieving content in response to user input at a computing device, comprising:
receiving a search request comprising a data characteristic and a user-specific interaction characteristic;
maintaining a contextual user model, the contextual user model comprising:
gaze-tracking data comprising one or more real-time sensor inputs indicative of a person's gaze in relation to on-screen locations of a display of the computing device; and semantic descriptions of user interface elements displayed at the on-screen locations corresponding to the gaze-tracking data, the semantic descriptions comprising information about the user interface elements;

interpreting the search request based on the contextual user model;

developing a search query based on the interpreted search request;

executing the search query across one or more software applications to obtain one or more search results; and presenting the search results at the computing device.

32. A computing system comprising:

a display;

a sensor subsystem to obtain gaze-tracking data, the gaze-tracking data being indicative of a user's gaze in relation to the display;

one or more processors; and one or more machine-readable media having stored therein a plurality of instructions that when executed by the processor cause the computing system to perform the method of claim 31.

\* \* \* \* \*